(12) United States Patent
Ishida

(10) Patent No.: US 12,530,632 B2
(45) Date of Patent: Jan. 20, 2026

(54) MANAGEMENT SYSTEM FOR UNMANNED MOBILE STORE

(71) Applicant: TAISHO SKY BUILDING, INC., Tokyo (JP)

(72) Inventor: Kazuharu Ishida, Tokyo (JP)

(73) Assignee: TAISHO SKY BUILDING, INC., Tokyo (JP)

( * ) Notice: Subject to any disclaimer, the term of this patent is extended or adjusted under 35 U.S.C. 154(b) by 17 days.

(21) Appl. No.: 18/449,718

(22) Filed: Aug. 15, 2023

(65) Prior Publication Data

US 2023/0394382 A1 Dec. 7, 2023

Related U.S. Application Data

(63) Continuation of application No. PCT/JP2021/005443, filed on Feb. 15, 2021.

(51) Int. Cl.
*G06Q 10/02* (2012.01)
*G06Q 10/087* (2023.01)
(Continued)

(52) U.S. Cl.
CPC .......... *G06Q 10/02* (2013.01); *G06Q 10/087* (2013.01); *G06Q 20/203* (2013.01); *G06V 20/56* (2022.01); *G06V 40/10* (2022.01); *G06V 40/20* (2022.01)

(58) Field of Classification Search
CPC .... G06Q 10/02; G06Q 10/087; G06Q 20/203; G06Q 10/0832; G06Q 10/0836;
(Continued)

(56) References Cited

U.S. PATENT DOCUMENTS 9,828,092 B1 * 11/2017 Navot .................... B64U 10/14
10,216,188 B2 * 2/2019 Brady ................. G06Q 10/0837
(Continued)

FOREIGN PATENT DOCUMENTS

CN 109448278 A 3/2019
CN 110740923 A 1/2020
(Continued)

OTHER PUBLICATIONS

KR20150020738A—Auto-driving unmanned car sharing system and operating method thereof, 16 pages. (Year: 2025).*
(Continued)

*Primary Examiner* — Tuyen K Vo
(74) *Attorney, Agent, or Firm* — Morgan, Lewis & Bockius LLP

(57) ABSTRACT

An unmanned-mobile store management system includes a store main body, a management server that manages the store main body, and a terminal device that receives an operation input of a subscriber. The store main body includes a housing unit that houses a commodity, a closing unit that closes the commodity housed in the housing unit such that the commodity is not allowed be provided, and a moving unit that moves the store main body. The management server includes a reservation information setting section that receives a reservation of the store main body through the terminal device and stores and sets reservation information regarding a reservation location in the storage section, and a movement control section that causes the moving unit to move the store main body to the reservation location based on the reservation information.

34 Claims, 15 Drawing Sheets

(51) Int. Cl.
*G06Q 20/20* (2012.01)
*G06V 20/56* (2022.01)
*G06V 40/10* (2022.01)
*G06V 40/20* (2022.01)

(58) Field of Classification Search
CPC ........ G06Q 10/20; G06Q 20/18; G06Q 20/20; G06Q 20/385; G06Q 20/401; G06Q 20/40145; G06Q 20/405; G06Q 30/06; G06Q 30/0601; G06Q 50/06; G06V 20/56; G06V 40/10; G06V 40/20; G07F 7/005; G07F 9/001; G07F 9/002; G07F 9/0235; G07F 11/00; G07F 11/004; G07F 17/0014
See application file for complete search history.

(56) References Cited

U.S. PATENT DOCUMENTS

| | | | | |
|---|---|---|---|---|
| 10,551,851 | B2* | 2/2020 | Yu | G05D 1/667 |
| 11,794,816 | B2* | 10/2023 | Iwasaki | G05D 1/0212 |
| 2015/0006005 | A1* | 1/2015 | Yu | G05D 1/667 |
| | | | | 701/22 |
| 2017/0228690 | A1* | 8/2017 | Kohli | G06Q 20/10 |
| 2018/0024554 | A1* | 1/2018 | Brady | G06Q 10/0833 |
| | | | | 701/23 |
| 2018/0232839 | A1 | 8/2018 | Heinla et al. | |
| 2019/0033856 | A1* | 1/2019 | Ferguson | G06K 19/0723 |
| 2019/0236961 | A1 | 8/2019 | Kaneko et al. | |
| 2020/0005229 | A1 | 1/2020 | Durkee et al. | |
| 2020/0207419 | A1 | 7/2020 | Iwasaki et al. | |
| 2020/0334651 | A1 | 10/2020 | Ibe | |
| 2020/0339025 | A1* | 10/2020 | Yu | G06Q 50/10 |
| 2020/0356945 | A1 | 11/2020 | Durkee et al. | |
| 2022/0180460 | A1* | 6/2022 | Ishida | G06Q 30/0645 |

FOREIGN PATENT DOCUMENTS

| | | | | | |
|---|---|---|---|---|---|
| CN | 110945448 | A | * | 3/2020 | ............... A23L 2/52 |
| CN | 210295197 | U | | 4/2020 | |
| CN | 111512349 | A | | 8/2020 | |
| EP | 3965082 | A2 | * | 3/2022 | ............. B60Q 5/005 |
| JP | 2004-276782 | A | | 10/2004 | |
| JP | 2009-244032 | A | | 10/2009 | |
| JP | 2013-088870 | A | | 5/2013 | |
| JP | 2014-013498 | A | | 1/2014 | |
| JP | 2015-069594 | A | | 4/2015 | |
| JP | 2015-138324 | A | | 7/2015 | |
| JP | 2017-102502 | A | | 6/2017 | |
| JP | 2019-502975 | A | | 1/2019 | |
| JP | 2019-133334 | A | | 8/2019 | |
| JP | 2019156624 | A | * | 9/2019 | |
| JP | 6687214 | B1 | | 4/2020 | |
| WO | WO2018/230720 | A1 | | 12/2018 | |

OTHER PUBLICATIONS

Office Action issued on Jan. 30, 2024 for corresponding Taiwanese Patent Application No. 111105308, 34 pgs.
Machine Translation of CN109448278A(Year:2019)_English Abstract, 1 pg.
Machine Translation of CN109448278A(Year:2019)_Description & Claims, 8 pgs.
Taisho Sky Building, Inc., Trial and Appeal Decision for JP Patent Application No. 2021-540075, Sep. 5, 2023, 54 pgs.
Taisho Sky Building, Inc., International Search Report and Written Opinion dated Apr. 27, 2021 for PCT/JP2021/005443, 17 pgs.
Office Action mailed on Oct. 5, 2021 for the corresponding Japanese Patent Application No. 2021-540075, 10 pgs.
Decision of Refusal mailed on Jan. 11, 2022 for the corresponding Japanese Patent Application No. 2021-540075, 8 pgs.
Office Action mailed on May 23, 2023 for the corresponding Japanese Patent Application No. 2021-540075 (Appeal No. 2022-005290), 28 pgs.

* cited by examiner

MANAGEMENT SYSTEM FOR UNMANNED MOBILE STORE

RELATED APPLICATIONS

The present application is a continuation of International Patent Application No. PCT/JP2021/005443, filed Feb. 15, 2021, which is hereby incorporated by reference in its entirety.

TECHNICAL FIELD

The present disclosure relates to an unmanned-mobile store management system.

BACKGROUND

Conventionally, there is known a management system for a store main body including a store main body including a housing unit that houses commodities such as articles and devices performing services, and a moving unit that moves the store main body, and a management server that manages the store main body. For example, a conventional scheduling device may create a schedule of stop-by points of a store main body such as a mobile store of a financial institution, a moving catering vehicle of a catering industry, and a bookmobile of a public institution. A vehicle such as a bus, a truck, or a small special vehicle may be adopted as a store main body, and a driver of the vehicle may go around a plurality of stop-by points based on a schedule created by the scheduling device.

Incidentally, in recent years, research and development of a moving body capable of moving to a predetermined location in an unmanned manner, such as a self-guided vehicle, a drone, and the like, have progressed. When such a moving body is adopted as a store main body, since the store main body can move to a predetermined location in an unmanned manner, it is considered that labor costs can be reduced and the efficiency of sales can be improved. However, when such a moving body is adopted as the store main body, although the store main body can move to a predetermined location in an unmanned manner, there is a problem that it is not possible to actually check commodities such as articles and devices performing services from the viewpoint of crime prevention.

SUMMARY

An object of the present disclosure is to provide an unmanned-mobile store management system capable of moving to a predetermined location in an unmanned manner and actually checking commodities such as articles and devices performing services.

An unmanned-mobile store management system of the present disclosure includes: a store main body that stores a commodity including an article and a device performing services; a management server that is connected to the store main body through a communication line and that manages the store main body; and a subscriber input unit that is connected to the management server through a communication line and that accepts an operation input of a subscriber. The store main body includes: a housing unit that houses a commodity; a closing unit that closes the commodity housed in the housing unit such that the commodity is not allowed be provided; a moving unit that moves the store main body; and a store-side control unit that controls the store main body. The management server includes a server-side control unit that controls the management server. The server-side control unit includes: a reservation information setting section that stores reservation information on a reservation location in a storage section and that sets the reservation information by accepting a reservation of the store main body through the subscriber input unit; and a movement control section that causes the moving unit to move the store main body to the reservation location based on the reservation information.

According to such a configuration, the store main body includes the housing unit that houses a commodity, and the closing unit that closes the commodity housed in the housing unit such that the commodity is not allowed be provided. In addition, the management server includes the reservation information setting section that stores and sets reservation information regarding the reservation location in the storage section, and a movement control section that causes the moving unit to move the store main body to the reservation location based on the reservation information set by the reservation information setting section. Accordingly, it is possible to move the store main body to a predetermined location in an unmanned manner, and it is possible to allow the subscriber to actually confirm the commodity stored in the store main body by going to the reservation location or waiting at the reservation location. Here, the behavior of actually confirming a commodity does not include a behavior of purchasing an article or a behavior of receiving provision of a service, but includes, for example, a behavior of taking an article, confirming the article, and returning the article without purchasing the article, a behavior of trying a device for providing a service, and the like.

In the present disclosure, preferably, the reservation information setting section stores reservation information regarding a reservation date and time in a storage section, and the movement control section causes the moving unit to move the store main body to the reservation location on the reservation date and time based on the reservation information.

According to such a configuration, since the movement control section causes the moving unit to move the store main body to the reservation location on the reservation date and time based on the reservation information, it is possible to cause the store main body to move to the predetermined location at predetermined time in an unmanned manner, and it is possible to allow the subscriber to actually confirm the commodity stored in the store main body by going to the reservation location on the reservation date and time or waiting at the reservation location.

In the present disclosure, preferably, the server-side control unit includes a movement status informing section that informs the subscriber of movement status of the store main body.

According to such a configuration, since the server-side control unit includes the movement status informing section that informs the subscriber of the movement status of the store main body, this enables the subscriber to easily grasp the movement status of the store main body, and to confirm the present position of the store main body, the estimated arrival time to the reservation location, and the like.

In the present disclosure, preferably, the reservation information setting section stores the reservation information on the subscriber in the storage section. The store-side control unit includes: a subscriber determination section that determines whether a visitor is a subscriber based on the reservation information; and an opening setting section that opens the closing unit to provide the commodity housed in the housing unit when the subscriber determination section determines that the visitor is the subscriber.

According to such a configuration, the store-side control unit includes the subscriber determination section that determines whether a visitor is a subscriber based on the reservation information, and the opening setting section that opens the closing unit and that allows the commodity housed in the housing unit to be provided when the subscriber determination section determines that the visitor is the subscriber. Accordingly, it is possible to provide the subscriber for the commodity housed in the housing unit by going to the reservation location or waiting at the reservation location. Note that in the present disclosure, making it possible to provide commodity means making it possible to take out an article when the article is an article and making it possible to provide a service when the article is a service.

In the present disclosure, preferably, the store-side control unit includes a provision determination section that determines whether the commodity housed in the housing unit is provided.

According to such a configuration, since the store-side control unit includes the provision determination section that determines whether the commodity housed in the housing unit is provided. Thus, when the closing unit is opened to allow the commodity housed in the housing unit to be provided, it is possible to grasp the provision amount of the commodity provided to the subscriber. Therefore, the store main body can count, for example, the sales amount of the article, the service provision time, and the like, and execute the billing to the subscriber.

In the present disclosure, preferably, the store main body includes: a store-side display unit that displays information; and a store-side input unit that accepts an operation input. The store-side control unit includes: a store-side display control section that causes the store-side display unit to display a provision amount of a commodity provided to a subscriber based on presence or absence of provision of a commodity determined by the provision determination section; and a store-side payment acceptance section that accepts a payment according to a provision amount of a commodity provided to the subscriber through the store-side input unit.

According to such a configuration, the store-side control unit includes: the store-side display control section that causes the store-side display unit to display the provision amount of the commodity provided to the subscriber based on the presence or absence of the provision of the commodity determined by the provision determination section; and the store-side payment acceptance section that accepts a payment according to the provision amount of the commodity provided to the subscriber through the store-side input unit. Accordingly, it is possible to allow the subscriber to make a payment according to the provision amount of the commodity through the store-side input unit.

In the present disclosure, preferably, the subscriber input unit includes: a reservation-side display unit that displays information; and a reservation-side input unit that accepts an operation input. The server-side control unit includes: a server-side display control section that causes the reservation-side display unit to display a provision amount of a commodity provided to the subscriber based on presence or absence of provision of a commodity determined by the provision determination section; and a server-side payment acceptance section that accepts a payment according to a provision amount of a commodity provided to the subscriber through a reservation side input unit.

According to such a configuration, the server-side control unit includes: the server-side display control section that causes the reservation-side display unit to display the provision amount of the commodity provided to the subscriber based on the presence or absence of the provision of the commodity determined by the provision determination section; and the server-side payment acceptance section that accepts a payment according to the provision amount of the commodity provided to the subscriber through the reservation-side input unit. Accordingly, this enables the subscriber to make a payment according to the provision amount of the commodity through the reservation-side input unit.

In the present disclosure, preferably, the store-side control unit includes a closure determination section that determines whether the housing unit is closed by the closing unit.

According to such a configuration, since the store-side control unit includes the closure determination section that determines whether the housing unit is closed by the closing unit, for example, it is determined whether the housing unit is closed by the closing unit at the reservation end time, and when a determination is made that the housing unit is not closed, it is possible to automatically close the housing unit by the closing unit.

In the present disclosure, preferably, the server-side control unit includes a location securing execution section that secures a reservation location based on the reservation information.

According to such a configuration, since the server-side control unit includes the location securing execution section that executes the securing of the reservation location based on the reservation information, this enables the server-side control unit to automatically secure the reservation location and pay a parking fee even when a parking lot or the like is used as the reservation location, for example.

In the present disclosure, preferably, the store-side control unit includes: a stock determination section that determines whether a stock of the commodity housed in the housing unit is insufficient; and a stock replenishment execution section that replenishes a stock of the commodity housed in the housing unit when the stock determination section determines that the stock of the commodity is insufficient.

According to such a configuration, since the store-side control unit includes the stock determination section that determines whether the stock of the commodity housed in the housing unit is insufficient, and the stock replenishment execution section that replenishes the stock of the commodity housed in the housing unit when the stock determination section determines that the stock of the commodity is insufficient, it is possible to automatically execute the replenishment of the stock of the commodity housed in the housing unit.

In the present disclosure, preferably, the store-side control unit includes: an energy determination section that determines whether energy of a store main body is insufficient; and an energy replenishment execution section that replenishes energy of the store main body when the energy determination section determines that the energy is insufficient.

According to such a configuration, since the store-side control unit includes the energy determination section that determines whether the energy of the store main body is insufficient and the energy replenishment execution section that replenishes the energy of the store main body when the energy determination section determines that the energy is insufficient, it is possible to automatically replenish the energy of the store main body.

In the present disclosure, preferably, the energy replenishment execution section receives energy supply from another store main body and replenishes energy of the store main body.

According to such a configuration, since the energy replenishment execution section receives energy supply from another store main body and replenishes energy of the store main body, this enables the energy replenishment execution section to receive energy supply from another store main body moving near the energy replenishment execution section without moving to a predetermined location.

In the present disclosure, preferably, the subscriber input unit includes a reservation-side display unit that displays information. The server-side control unit includes a server-side display control section that causes the reservation-side display unit to display the commodity housed in the housing unit.

According to such a configuration, since the server-side control unit includes the server-side display control section that causes the reservation-side display unit to display the commodity housed in the housing unit, this enables the subscriber to confirm the commodity stored in the store main body before reservation.

The present disclosure preferably includes a first store main body, and a second store main body different from the first store main body. The reservation information setting section stores reservation information on a commodity desired by the subscriber in the storage section. The server-side control unit includes a store main body selecting section that selects at least one of a first store main body and a second store main body as a store main body including a commodity desired by a subscriber based on the reservation information. The movement control section causes the moving unit to move the store main body selected by the store main body selecting section to the reservation location based on the reservation information.

According to such a configuration, the server-side control unit includes the store main body selecting section that selects at least one of the first store main body and the second store main body as the store main body including the commodity desired by the subscriber based on the reservation information, and the movement control section causes the moving unit to move the store main body selected by the store main body selecting section to the reservation location based on the reservation information. Accordingly, this enables the subscriber to reliably confirm the commodity stored in the store main body by going to the reservation location or waiting at the reservation location.

In the present disclosure, preferably, the reservation information setting section stores reservation information on the subscriber and a commodity desired by the subscriber in the storage section. The store-side control unit includes: a subscriber determination section that determines whether a visitor is a subscriber based on the reservation information; a commodity determination section that determines whether the commodity is the commodity desired by the subscriber based on the reservation information; and a desired commodity opening setting section that opens the closing unit to provide the commodity housed in the housing unit when the subscriber determination section determines that a visitor is the subscriber and the commodity determination section determines that the commodity is the commodity desired by the subscriber.

According to such a configuration, the store-side control unit includes the desired commodity opening setting section that opens the closing unit to provide the commodity housed in the housing unit when the subscriber determination section determines that the visitor is the subscriber and the commodity determination section determines that the commodity is the commodity desired by the subscriber. Accordingly, this enables the subscriber to reliably receive the provision of the desired commodity without providing the desired commodity to other subscribers.

In the present disclosure, preferably, the store-side control unit includes an abnormality notification section that informs a management server of an abnormality of a store main body through a communication line when an abnormality having occurred in the store main body is detected. The server-side control unit includes an abnormality informing section that informs an administrator of the abnormality of the store main body when the abnormality notification section informs the abnormality of the store main body.

According to such a configuration, since the server-side control unit includes the abnormality informing section that informs the administrator of the abnormality of the store main body when the abnormality notification section informs the abnormality of the store main body, this enables the administrator to easily grasp the abnormality such as the damage of the store main body, the removal of the article, and the unauthorized use of the device that performs the service even in the unmanned-mobile store in which the article can be moved to a predetermined location in an unmanned manner and the commodity such as the device that performs the service can be actually checked.

In the present disclosure, preferably, the store-side control unit includes a normal opening determination section that determines whether the closing unit is normally opened and detects an abnormality occurring in the store main body when a determination is made that the closing unit is not normally opened.

According to such a configuration, since the store-side control unit includes the normal opening determination section that determines whether the closing unit is normally opened and detects the abnormality occurring in the store main body when a determination is made that the closing unit is not normally opened, this enables the normal opening determination section to detect, as an abnormality, the opening of the closing unit by the intruder using an unauthorized scheme such as picking unlike the subscriber who is allowed to normally open the closing unit, i.e., the subscriber permitted by the administrator, and it is possible to improve the safety of the store main body.

In the present disclosure, preferably, the store main body includes a service unit that serves a subscriber. The store-side control unit includes a service execution section that executes a service by the service unit when the normal opening determination section determines that the closing unit is normally opened.

According to such a configuration, since the store-side control unit includes the service execution section that executes the service by the service unit when the normal opening determination section determines that the closing unit is normally opened, it is possible to execute the service by the service unit for the subscriber who is allowed to normally open the closing unit, i.e., the subscriber permitted by the administrator. Here, as the content of the service by the service unit, for example, contents including explaining the selling point of a commodity to the subscriber, guiding the subscriber to show around the inside of the store main body, or operating a lighting or an air conditioner installed in the store main body can be adopted. In addition, as the content of the service by the service unit, for example, a favorite commodity of the subscriber may be determined based on information such as the past use history of the subscriber, and the favorite commodity of the subscriber may be recommended.

In the present disclosure, preferably, the store main body includes an imaging unit that captures an image of a store main body. The store-side control unit includes: a behavior pattern storage section that stores a sample of a normal behavior pattern of a subscriber; a behavior pattern acquisition section that acquires a behavior pattern of a subscriber based on an image captured by an imaging unit; and a behavior pattern determination section that compares a sample of the behavior pattern stored in the behavior pattern storage section with the behavior pattern acquired by the behavior pattern acquisition section to determine whether the sample of the behavior pattern is different from the behavior pattern acquired by the behavior pattern acquisition section and that detects an abnormality occurring in the store main body when a determination is made that the sample of the behavior pattern is different from the behavior pattern acquired by the behavior pattern acquisition section.

According to such a configuration, since the store-side control unit includes the behavior pattern determination section that compares the sample of the normal behavior pattern of the subscriber of the store main body with the behavior pattern acquired by the behavior pattern acquisition section to determine whether there is a difference, and detects an abnormality occurring in the store main body when a determination is made that there is a difference. Therefore, for example, by storing a behavior pattern suitable for a normal subscriber such as looking around commodity in the behavior pattern storage section as a normal behavior pattern, it is possible to detect an intruder with a behavior suspicious behavior pattern such as coloring commodity as an abnormality by the behavior pattern determination section, and it is possible to improve the safety of the store main body.

In the present disclosure, preferably, the store main body includes an imaging unit that captures an image of a store main body. The store-side control unit includes: a behavior pattern storage section that stores a sample of a normal behavior pattern of a subscriber; a behavior pattern acquisition section that acquires a behavior pattern of a subscriber based on an image captured by an imaging unit; and a behavior pattern determination section that compares a sample of the behavior pattern stored in the behavior pattern storage section with the behavior pattern acquired by the behavior pattern acquisition section to determine whether the sample of the behavior pattern is different from the behavior pattern acquired by the behavior pattern acquisition section and that detects an abnormality occurring in the store main body when a determination is made that the sample of the behavior pattern is different from the behavior pattern acquired by the behavior pattern acquisition section.

According to such a configuration, the store-side control unit includes the behavior pattern determination section that compares a sample of the abnormal behavior pattern of the subscriber of the store main body with the behavior pattern acquired by the behavior pattern acquisition section to determine whether the sample of the abnormal behavior pattern matches the behavior pattern acquired by the behavior pattern acquisition section and that detects the abnormality occurring in the store main body when the sample of the abnormal behavior pattern matches the behavior pattern acquired by the behavior pattern acquisition section. Accordingly, for example, by storing a suspicious behavior pattern such as looking for a commodity in the behavior pattern storage section as an abnormal behavior pattern, this enables the behavior pattern determination section to detect an intruder with a suspicious behavior pattern as an abnormality, and it is possible to improve the safety of the store main body.

In the present disclosure, preferably, the server-side control unit includes: a reservation management section that manages reservation information including a reservation start time and reservation end time; a command creation section that creates a command to a store main body; and a command transmission section that transmits a command to a store main body through a communication line. The store-side control unit includes: a command receiving section that receives a command from a command transmission section; and a command execution section that executes a predetermined operation based on the command received by the command receiving section.

According to such a configuration, since the store-side control unit includes the command receiving section that receives the command from the command transmission section and the command execution section that executes a predetermined operation based on the command received by the command receiving section, it is possible to approach the subscriber who is looking around at commodities by executing the operation based on an appropriate command. Therefore, for example, it is possible to suppress excess time by informing the subscriber of the reservation end time by the store-side control unit, it is possible to set shorter idle time by the next reservation of the subscriber, and it is possible to increase the utilization rate of the store main body.

In the present disclosure, preferably, the command creation section creates an informing command that informs reservation end time based on the reservation information, and the command execution section informs the subscriber of the reservation end time based on the informing command.

According to such a configuration, since the command execution section informs the subscriber of the reservation end time based on the informing command, the store-side control unit informs the subscriber of the reservation end time. Thus, it is possible to suppress excess time, it is possible to set shorter idle time by the reservation of the next subscriber, and it is possible to increase the utilization rate of the store main body.

In the present disclosure, preferably, the reservation management section manages reservation information including reservation status at reservation end time or later, the command creation section creates an extension command that informs whether to extend the reservation time according to the reservation status based on the reservation information, and the command execution section informs the subscriber whether the extension is possible based on the extension command.

According to such a configuration, the command execution section informs the subscriber that whether the extension is possible based on the extension command. Accordingly, this enables the command execution section to inform the subscriber that the extension is possible when the store main body has idle time at reservation end time or later. In addition, when the store main body has no idle time at reservation end time or later, it is possible to inform the subscriber that extension is impossible.

In the present disclosure, preferably, the store main body includes an extension acceptance unit that accepts an input of an extension application by a subscriber. The store-side control unit includes an application transmission section that transmits an extension application to a management server through a communication line when the extension receiving unit receives an input of the extension application. The server-side control unit includes an application receiving section that receives an extension application transmitted from an application transmission section. The reservation management section updates the reservation information by changing the reservation end time based on the extension application received by the application receiving section.

According to such a configuration, the server-side control unit includes the application receiving section that receives the extension application transmitted from the application transmission section, and the reservation management section changes the reservation end time and updates the reservation information based on the extension application received by the application receiving section. Accordingly, it is possible to execute the extension process based on the extension application of the subscriber.

In the present disclosure, preferably, a maintenance device that performs maintenance of a store main body is included. The server-side control unit includes: a reservation management section that manages reservation information including a reservation start time and a reservation end time; an idle time acquisition section that acquires an idle time of a store main body based on reservation information; a status determination section that determines whether the idle time is idle time of the store main body based on an acquisition result of the idle time acquisition section; and a management mode switching section that switches a management mode of the store main body from the normal mode to the maintenance mode in which maintenance of the store main body is executed by the maintenance device when the status determination section determines that the idle time is idle time of the store main body.

According to such a configuration, the server-side control unit includes the idle time acquisition section that acquires the idle time of the store main body based on the reservation information, the status determination section that determines whether it is the idle time of the store main body based on the acquisition result of the idle time acquisition section, and the management mode switching section that switches the management mode of the store main body from the normal mode to the maintenance mode in which the maintenance of the store main body is executed by the maintenance device when the status determination section determines that it is the idle time of the store main body. Accordingly, it is possible to execute the maintenance of the store main body before the reservation start time of the next subscriber. Accordingly, it is possible to cause the maintenance device to execute the maintenance by efficiently using the idle time of the store main body, it is possible to reduce the manual maintenance work, and it is possible to suppress the operation cost of the unmanned-mobile store management system.

In the present disclosure, preferably, the server-side control unit includes: a device management section that manages a time necessary to execute maintenance by a maintenance device; and a maintenance determination section that determines whether maintenance is allowed to be executed based on the idle time acquired by the idle time acquisition section and the necessary time of the maintenance device when the management mode switching section switches the mode to the maintenance mode. The device management section causes the maintenance device to perform maintenance when the maintenance determination section determines that maintenance is performable.

According to such a configuration, the server-side control unit includes the maintenance determination section that determines whether the maintenance is executable based on the idle time acquired by the idle time acquisition section and the necessary time of the maintenance device when the management mode switching section switches the mode to the maintenance mode, and the device management section causes the maintenance device to execute the maintenance when the maintenance determination section determines that the maintenance is executable. Accordingly, this enables the unmanned-mobile store management system to reliably end the maintenance before the reservation start time of the next subscriber.

In the present disclosure, preferably, a detecting unit that detects presence or absence of a moving body in a store main body. The status determination section determines, based on the detection result of the detecting unit and the acquisition result of the idle time acquisition section, whether time is the idle time of the store main body and whether a state is an unused status in which there is no moving body in the store main body. The management mode switching section switches the management mode of the store main body from the normal mode to the maintenance mode when the status determination section determines that the store main body is in the unused status.

According to such a configuration, the status determination section determines, based on the detection result of the detecting unit and the acquisition result of the idle time acquisition section, whether the time is the idle time of the store main body and the store main body is in the unused status in which there is no moving body in the store main body, and the management mode switching section switches the management mode of the store main body from the normal mode to the maintenance mode when the status determination section determines that the store main body is in the unused status. Accordingly, it is possible to confirm that the store main body is in the unused status in which there is no moving body in the store main body and it is possible to execute the maintenance of the store main body before the reservation start time of the next subscriber. Accordingly, it is possible to cause the maintenance device to execute the maintenance by efficiently using the idle time of the store main body, it is possible to reduce the manual maintenance work, and it is possible to suppress the operation cost of the unmanned-mobile store management system.

In the present disclosure, preferably, the server-side control unit includes a security mode switching section that switches the security mode from the normal mode to the security mode that executes the security of the store main body when the status determination section determines that the store main body is in the unused status.

According to such a configuration, since the server-side control unit includes the security mode switching section that switches the security mode from the normal mode to the security mode that executes the security of the store main body when the status determination section determines that the store main body is in the unused status, this enables the server-side control unit to execute the security of the store main body before the reservation start time of the next subscriber.

In the present disclosure, preferably, the server-side control unit includes: a security abnormality detecting section that detects an abnormality of the store main body based on a detection result of the detecting unit when the security mode switching section switches the mode to the security mode; and a security abnormality informing section that informs an administrator of the abnormality of the store main body when the security abnormality detecting section detects the abnormality of the store main body.

According to such a configuration, the server-side control unit includes the security abnormality detecting section that detects the abnormality of the store main body based on the detection result of the detecting unit when the security mode switching section switches the mode to the security mode, and the security abnormality informing section that informs the administrator of the abnormality of the store main body when the security abnormality detecting section detects the abnormality of the store main body. Accordingly, this enables the administrator to easily grasp the abnormality of the store main body.

In the present disclosure, preferably, the security abnormality detecting section does not detect the operation of the maintenance device as an abnormality of the store main body.

According to such a configuration, since the security abnormality detecting section does not detect the operation of the maintenance device as an abnormality of the store main body, this enables the server-side control unit to cause the maintenance device to execute maintenance even when the security mode switching section switches the mode to the security mode.

In the present disclosure, preferably, the server-side control unit includes a security command transmission section that transmits a command that executes the security of the store main body to an external security system through a communication line when the security mode switching section switches the mode to the security mode.

According to such a configuration, since the server-side control unit includes the security command transmission section that transmits a command that executes the security of the store main body to the external security system through the communication line when the security mode switching section switches the mode to the security mode, a device that executes the security of the store main body is not necessarily included, it is possible to simplify the configuration of the store main body, and it is possible to further suppress the operation cost of the unmanned-mobile store management system.

In the present disclosure, preferably, the store main body includes: a booth provided with a housing unit and a closing unit; and a carrier provided with a moving unit that moves the booth. The store-side control unit includes: a booth-side control unit that controls the booth; and a carrier-side control unit that controls the carrier. The booth and the carrier are detachably formed.

According to such a configuration, the store main body includes the booth provided with the housing unit and the closing unit, and the carrier provided with the moving unit that moves the booth, and the booth and the carrier are detachably formed. Therefore, after the movement control section moves the store main body to the reservation location based on the reservation information, the booth and the carrier are separated from each other. Accordingly, this enables the carrier to be moved independently. Therefore, the unmanned-mobile store management system enables efficient operation by individually controlling the booth and the carrier.

In the present disclosure, preferably, the store main body includes at least one booth; and a plurality of carriers. The booth and the carrier are detachably formed.

According to such a configuration, the store main body includes at least one booth and a plurality of carriers, and the booth and the carrier are detachably formed. Therefore, for example, after the booth is moved to the reservation location by a certain carrier, the booth can be collected by another carrier. Therefore, the unmanned-mobile store management system enables efficient operation by individually controlling the booth and the carrier.

In the present disclosure, preferably, the server-side control unit includes: a separation control section that causes the moving unit to move the store main body to a reservation location by the movement control section based on the reservation information by a movement control section, and then separates the booth from the carrier to make the carrier movable independently; and a collection control section that collects the booth by coupling the booth to the carrier after moving the carrier to a location where the booth is present based on the establishment of a predetermined condition.

According to such a configuration, since the server-side control unit includes the collection control section that collects the booth by moving the carrier to the location where the booth is present based on the establishment of the predetermined condition and then couples the booth to the carrier, it is possible to cause the carrier to collect the booth under a predetermined condition that the confirmation of the commodity by the subscriber is completed, for example. Therefore, the unmanned-mobile store management system enables efficient operation by individually controlling the booth and the carrier.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

DETAILED DESCRIPTION

First Embodiment

In the following, a first embodiment of the present disclosure will be described with reference to the drawings.

Figure 1:
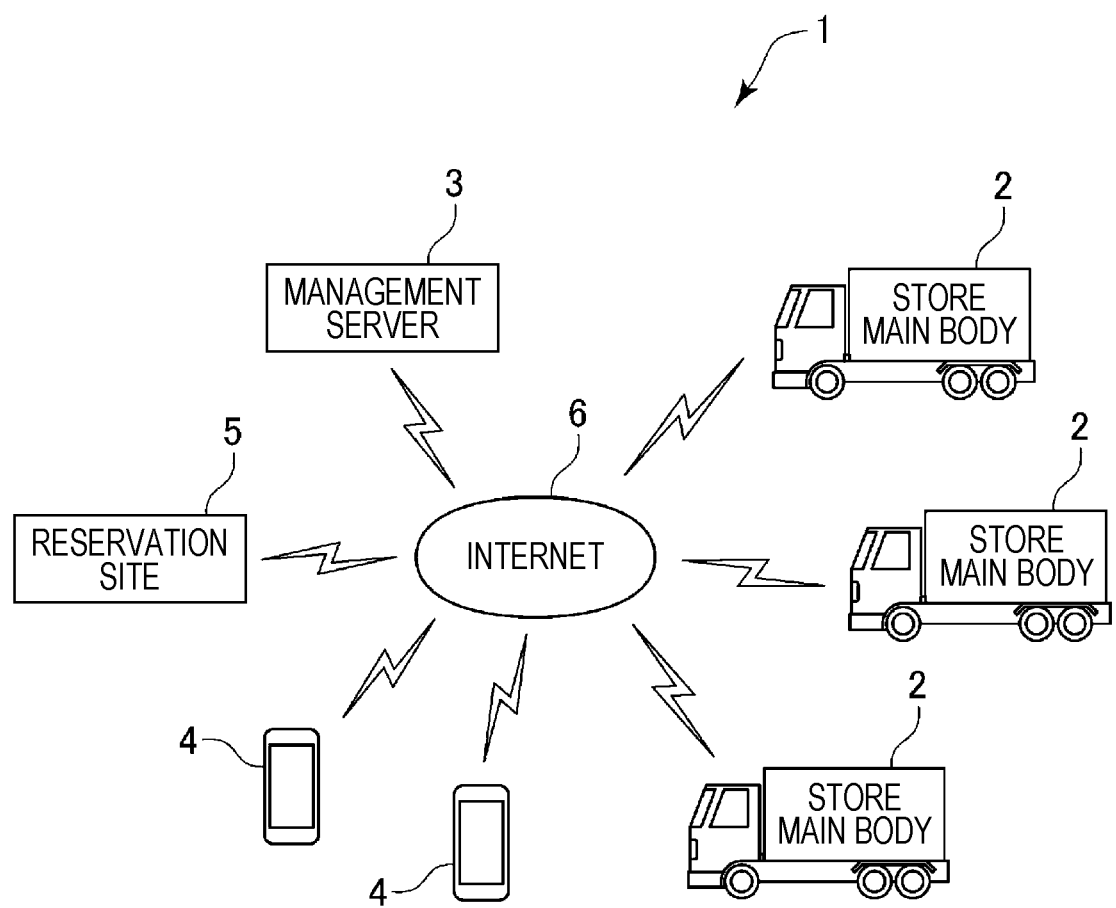
FIG. 1 is a schematic diagram of an unmanned-mobile store management system according to a first embodiment of the present disclosure.

FIG. 1 is a schematic diagram of an unmanned-mobile store management system according to the first embodiment of the present disclosure. As shown in FIG. 1, an unmanned-mobile store management system 1 includes a store main body 2 that stores a commodity including an article and a service for providing services, a management server 3 that manages the store main body 2, a terminal device 4 such as a mobile phone, a smartphone, or a personal computer possessed by a subscriber who wishes to reserve the store main body 2, and a reservation site 5 at which reservation of the store main body 2 is made. The store main body 2, the management server 3, the terminal device 4, and the reservation site 5 are communicably connected to each other via an Internet 6 which is a public network as a communication line.

The subscriber can access the management server 3 or the reservation site 5 via the Internet 6 using the terminal device 4, specify the use time, and execute the reservation of the store main body 2. When accepting the reservation from the subscriber, the reservation site 5 transmits reservation information regarding the subscriber, the reservation date and time, and the reservation location to the management server 3.

Figure 2:
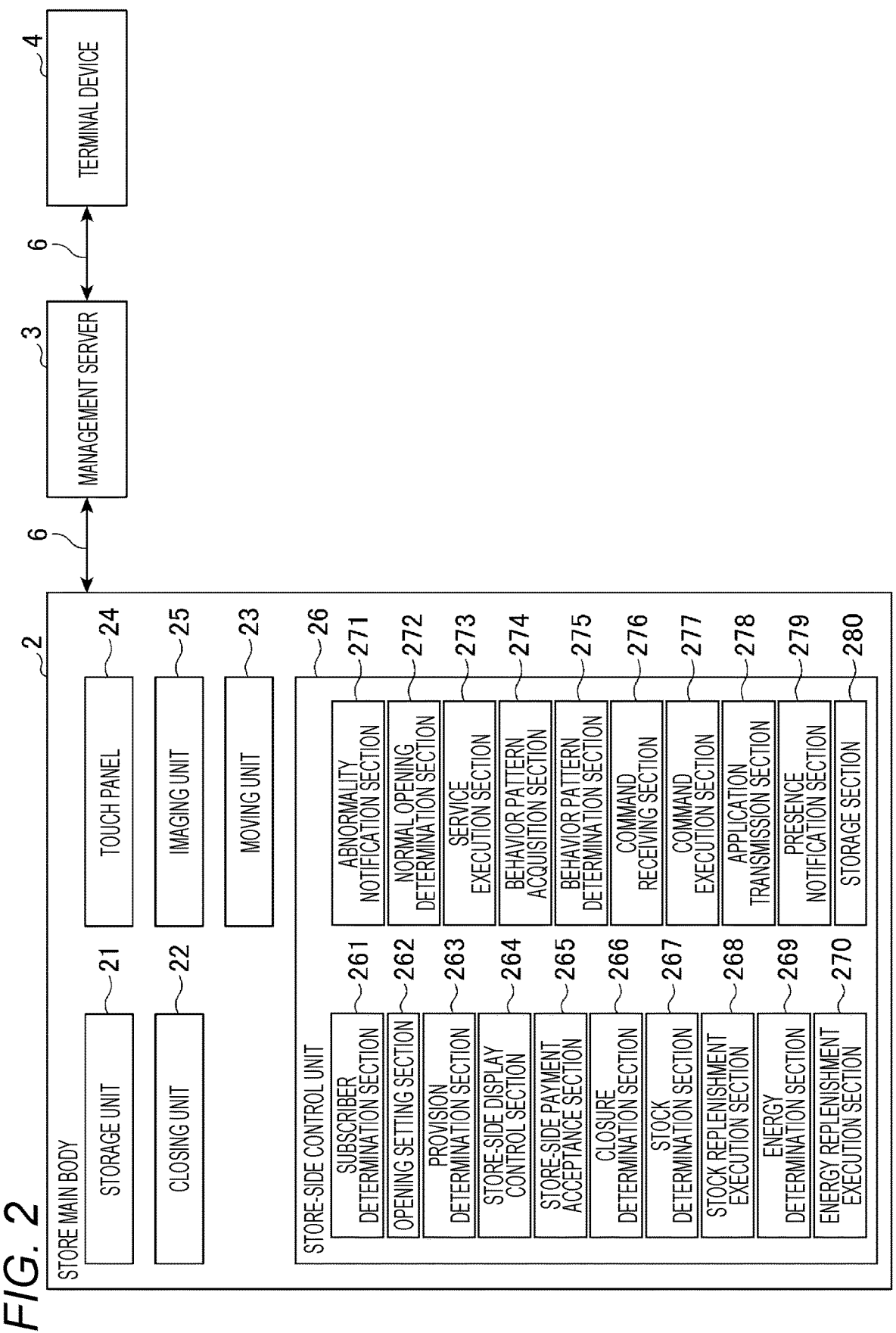
FIG. 2 is a schematic diagram showing functions of a store main body.

FIG. 2 is a schematic diagram showing functions of the store main body. As shown in FIG. 2, the store main body 2 includes a housing unit 21 that stores a commodity, a closing unit 22 that closes the commodity housed in the housing unit 21 so as not to be providable, a moving unit 23 that moves the store main body 2, a touch panel 24 that displays information and receives an operation input, an imaging unit 25 that captures an image of the store main body 2, and a store-side control unit 26 that controls the store main body 2.

Any housing unit may be adopted as the housing unit 21 as long as the commodity can be stored. For example, when articles such as small articles and food items are used as the commodity, the housing unit 21 may adopt a small showcase or the like, and when a device that performs services such as beauty treatment and massage is used as the commodity, a large container or the like may be adopted.

The closing unit 22 is a lock device that is openable by an authentication key such as a personal identification number issued from the management server 3 to the terminal device 4 of the subscriber or an optical code such as a barcode and a QR code (registered trademark). This authentication key is changed randomly each time when the authentication key is used, and a subscriber who has made a reservation at that time can open the closing unit 22 using a unique authentication key.

Note that in the present embodiment, the authentication key adopts a personal identification number, an optical code such as a bar code and a QR code (registered trademark), or the like. However, for example, biometric authentication such as face authentication, fingerprint authentication, or retina authentication may be adopted, and any authentication may be adopted as long as the closing unit 22 is openable.

In addition, in the present embodiment, the closing unit 22 is a lock device that is openable by an authentication key issued from the management server 3 to the terminal device 4 of the subscriber. The authentication key may be transmitted from the management server to the subscriber input unit, or may be browsable by operating the subscriber input unit. In addition, the closing unit may be openable or closeable, for example, by receiving an operation input transmitted from the subscriber input unit.

In regard to the moving unit 23, any device may be adopted as long as the store main body 2 can be moved to the reservation location in an unmanned manner. For example, for the moving unit 23, a self-guided vehicle, a drone, or the like may be adopted.

The touch panel 24 receives an input of information in accordance with an operation of the subscriber, and provides the subscriber with predetermined information in an image. In other words, the touch panel 24 functions as a store-side display unit and a store-side input unit.

Note that in the present embodiment, although the store-side display unit and the store-side input unit are integrally mounted on the store main body 2 by the touch panel 24, the store-side display unit and the store-side input unit may be individually mounted, and a display device or an input device different from the touch panel 24 may be adopted. In short, the store-side display unit only has to be able to display information, and the store-side input unit only has to be able to receive an operation input. In addition, instead of the function of displaying information, information may be transmitted to the subscriber using voices, hologram, virtual reality (VR), augmented reality (AR), or the like, or instead of the function of receiving an operation input, an input of information from the subscriber may be received using voices, hologram, virtual reality (VR), augmented reality (AR), or the like.

The imaging unit 25 captures an image of the store main body 2 and its surroundings. For example, the imaging unit 25 mainly captures an image of the inside of the housing unit 21 and an image of the periphery of the housing unit 21 when articles such as small articles and food items are used as the commodity, and mainly captures an image of the inside of the housing unit 21 when a device that performs services such as beauty treatment and massage is used as the commodity. In addition, the imaging unit 25 detects the presence of a subscriber (human). As the imaging unit 25, for example, a charge coupled device (CCD) camera or the like can be adopted. Note that in the present embodiment, although the imaging unit 25 is adopted to detect the presence of the subscriber, a human sensor or the like may be adopted.

The store-side control unit 26 includes a central processing unit (CPU), a memory, and the like, and executes information processes according to a predetermined program stored in the memory. The store-side control unit 26 includes a subscriber determination section 261, an opening setting section 262, a provision determination section 263, a store-side display control section 264, a store-side payment acceptance section 265, a closure determination section 266, a stock determination section 267, a stock replenishment execution section 268, an energy determination section 269, and an energy replenishment execution section 270. In addition, the store-side control unit 26 includes an abnormality notification section 271, a normal opening determination section 272, a service execution section 273, a behavior pattern acquisition section 274, a behavior pattern determination section 275, a command receiving section 276, a command execution section 277, an application transmission section 278, a presence notification section 279, and a storage section 280.

The subscriber determination section 261 determines whether a visitor is a subscriber based on the reservation information described above. Specifically, the subscriber determination section 261 determines that the visitor is the subscriber when the input of the authentication key is normally received through the touch panel 24, and determines that the visitor is not the subscriber when the input of the authentication key is not normally received through the touch panel 24.

Note that the reservation information includes information regarding an authentication key in addition to the information regarding the subscriber, the reservation date and time, and the reservation location described above, and is stored in the storage section 280.

When the reservation start time included in the reservation information stored in the storage section 280 comes, or slightly before the reservation start time (e.g., ten minutes before the reservation start time), the store-side control unit 26 sets an authentication key corresponding to the reservation information in closing unit 22. As a result, the subscriber can open the closing unit 22 of the store main body 2 using the authentication key transmitted from the management server 3.

Then, when the reservation end time included in the reservation information stored in the storage section 280 has elapsed, or slightly after the reservation end time (e.g., ten minutes after the reservation end time), the store-side control unit 26 sets an authentication key different from the authentication key corresponding to the reservation information in the closing unit 22. As a result, the subscriber is not allowed to open the closing unit 22 of the store main body 2.

When the subscriber determination section 261 determines that a visitor is a subscriber, the opening setting section 262 opens the closing unit 22 to provide the commodity housed in the housing unit 21. Specifically, the opening setting section 262 unlocks the closing unit 22, which is a lock device, to provide the commodity housed in the housing unit 21. Here, making it possible to provide commodity means making it possible to take out an article when the article is an article and making it possible to provide a service when the article is a service.

The provision determination section 263 determines whether the commodity housed in the housing unit 21 is provided. Specifically, the provision determination section 263 causes the imaging unit 25 to capture an image of the inside of the housing unit 21 before the closing unit 22 is opened and an image of the inside of the housing unit 21 after the closing unit 22 is opened, the provision determination section 263 determines whether the commodity housed in the housing unit 21 is provided.

Note that in the present embodiment, although the provision determination section 263 determines the presence or absence of provision of the commodity housed in the housing unit 21 by causing the imaging unit 25 to capture an image of the inside of the housing unit 21, for example, the presence or absence of provision of the commodity housed in the housing unit 21 may be determined using a sensor. In short, the provision determination section only has to be able to determine whether the commodity housed in the housing unit is provided.

The store-side display control section 264 causes the touch panel 24 to display the provision amount of the commodity provided to the subscriber based on the presence or absence of the provision of the commodity determined by the provision determination section 263.

The store-side payment acceptance section 265 accepts the payment according to the amount of the commodity provided to the subscriber through the touch panel 24.

The closure determination section 266 determines whether the housing unit 21 is closed by the closing unit 22. Here, the closure determination section 266 determines whether the housing unit 21 is closed by the closing unit 22 after the payment is accepted by the store-side payment acceptance section 265 or when the reservation end time comes.

Note that in the present embodiment, when the closing unit 22 determines that the housing unit 21 is not closed, the closure determination section 266 automatically closes the closing unit 22 such that the commodity housed in the housing unit 21 is not allowed to be provided. However, for example, the closure determination section may prompt the subscriber to close the closing unit 22.

In addition, in the present embodiment, the closure determination section 266 determines whether the housing unit 21 is closed by the closing unit 22 after the payment is accepted by the store-side payment acceptance section 265 or when the reservation end time comes. On the other hand, the closure determination section 266 may periodically determine whether the housing unit 21 is closed by the closing unit 22 after the closing unit 22 is opened, and when it is determined that the housing unit 21 is closed, the payment according to the amount of the commodity provided to the subscriber by the store-side payment acceptance section 265 may be accepted through the touch panel 24.

In the present embodiment, after the closing unit 22 is automatically closed, or when the closure determination section 266 determines that the housing unit 21 is closed, the store-side control unit 26 notifies the management server 3 of the completion of business of the store main body 2 via the Internet 6. After that, the store-side control unit 26 brings the store main body 2 into standby status.

The stock determination section 267 determines whether the stock of the commodity housed in the housing unit 21 is insufficient. In the present embodiment, the stock determination section 267 compares the prescribed stock amount of the commodity stored in advance in the storage section 280 with the present stock amount of the commodity obtained by determining the presence or absence of the provision of the commodity housed in the housing unit 21 by causing the imaging unit 25 to capture the image of the inside of the housing unit 21, and determines whether the stock of the commodity housed in the housing unit 21 is insufficient.

Note that in the present embodiment, the prescribed stock amount of the commodity stored in advance in the storage section 280 is compared with the present stock amount of the commodity, and it is determined whether the stock of the commodity housed in the housing unit 21 is insufficient. On the other hand, for example, when information regarding the commodity desired by the subscriber is held as reservation information, it may be determined whether the stock of the commodity desired by the subscriber is insufficient. In addition, for example, a favorite commodity of the subscriber may be determined based on information such as the past use history of the subscriber, and it may be determined whether the stock of the favorite commodity of the subscriber is insufficient. In short, the stock determination section only hast to determine whether the stock of the commodity housed in the housing unit is insufficient.

When the stock determination section 267 determines that the stock of the commodity is insufficient, the stock replenishment execution section 268 replenishes the stock of the commodity housed in the housing unit 21. In the present embodiment, after moving the store main body 2 to a maintenance site (not shown) of the store main body 2 installed at a predetermined location by the moving unit 23, the stock replenishment execution section 268 automatically replenishes the stock of the commodity housed in the housing unit 21 in cooperation with a robot (not shown) that is disposed at the maintenance site to replenish commodities. Note that the stock replenishment execution section 268 may notify an operator of the stock to be replenished and manually replenish the stock of the commodity housed in the housing unit 21.

The energy determination section 269 determines whether energy (fuel, electric power, and the like) of the store main body 2 is insufficient.

The energy replenishment execution section 270 replenishes energy of the store main body 2 when the energy determination section 269 determines that the energy is insufficient. In the present embodiment, after moving the store main body 2 to the moving unit 23 to a maintenance site (not shown) of the store main body 2 installed at a predetermined location, the energy replenishment execution section 270 automatically executes energy replenishment in cooperation with a robot (not shown) that is disposed at the maintenance site to replenish energy Note that the energy replenishment execution section 270 may notify an operator of energy to be replenished and manually replenish energy.

Here, for example, the energy replenishment execution section may receive energy supply from another store main body and replenish energy of the store main body. When the energy replenishment execution section is formed in this manner, the energy replenishment execution section receives energy supply from another store main body and replenishes energy of the store main body. Therefore, the energy replenishment execution section can receive energy supply from another store main body moving near the energy replenishment execution section without moving to a predetermined location such as a maintenance site.

Note that in the present embodiment, the stock replenishment execution section 268 and the energy replenishment execution section 270 move the store main body 2 to the maintenance site of the store main body 2 installed at a predetermined location by the moving unit 23 to replenish the stock and the energy of the commodity. However, conversely, the stock replenishment execution section and the energy replenishment execution section 270 replenish the stock and the energy of the commodity by moving the maintenance site of the store main body 2 to the store main body 2.

When detecting an abnormality occurring in the store main body 2, the abnormality notification section 271 notifies the management server 3 of the abnormality of the store main body 2 via the Internet 6.

The normal opening determination section 272 determines whether the closing unit 22 is normally opened, and detects an abnormality occurring in the store main body 2 when a determination is made that the closing unit is not normally opened.

When the normal opening determination section 272 determines that the closing unit 22 is normally opened, the service execution section 273 executes the service using the touch panel 24. Specifically, the service execution section 273 displays the selling points of the commodity housed in the housing unit 21 on the display screen of the touch panel 24, and starts the explanation to the subscriber.

As described above, the touch panel 24 functions as a service unit that serves the subscriber. Note that in the present embodiment, although the touch panel 24 is adopted as the service unit, for example, a robot that can freely move the store main body may be adopted to guide the subscriber to show the store main body around, or the lighting or the air conditioner may be connected to the lighting or the air conditioner installed in the store main body through a communication line to automatically operate the lighting or the air conditioner. In short, any service unit may be adopted as long as the service unit can serve the subscriber.

In addition, in the present embodiment, although the touch panel 24 is adopted as the service unit, the service unit may be formed using a technology different from the touch panel 24. In short, the service unit may transmit information to the subscriber using voices, hologram, VR, AR, or the like, or may receive an input of information from the subscriber.

The behavior pattern acquisition section 274 acquires the behavior pattern of the subscriber based on the image captured by the imaging unit 25. The behavior pattern determination section 275 compares a plurality of samples of the behavior patterns stored in the storage section 280 with the behavior pattern acquired by the behavior pattern acquisition section 274 to determine whether there is a difference, and detects an abnormality occurring in the store main body 2 when a determination is made that there is a difference.

Here, the storage section 280 stores in advance a plurality of samples of normal behavior patterns of the subscriber. Specifically, for example, the storage section 280 stores, as a normal behavior pattern, a behavior pattern based on a normal reservation such as looking around the store main body 2. As described above, in the present embodiment, the storage section 280 functions as a behavior pattern storage section.

Note that in the present embodiment, although the storage section 280 is formed of the memory of the store-side control unit 26, the storage section 280 may be formed of a hard disk drive (HDD), a network attached storage (NAS), or the like, or may be formed with a cloud service.

In addition, although the functions of the store-side control unit 26 are executed according to a program stored in the storage section 280, the functions may be formed with independent devices or by cloud computing.

As described above, in the present embodiment, the abnormality notification section 271 notifies the management server 3 of the abnormality of the store main body 2 via the Internet 6 when the normal opening determination section 272 detects the abnormality occurring in the store main body 2 and when the behavior pattern determination section 275 detects the abnormality occurring in the store main body 2.

On the other hand, for example, sound collecting unit such as a microphone may collect sounds of the store main body 2, determine whether damage or the like of the store main body 2 has occurred based on the collected sound, and detect an abnormality occurring in the store main body 2 when a determination is made that damage or the like of the store main body 2 has occurred. In short, the abnormality notification section only has to be able to notify the management server of the abnormality of the store main body through the communication line when detecting the abnormality occurring in the store main body.

In addition, for example, it may be determined whether a noise sensor has detected noise of the store main body, and when a determination is made that the noise of the store main body is detected, an abnormality occurring in the store main body may be detected, or it may be determined whether a carbon dioxide sensor has detected an increase in the concentration of carbon dioxide in the store main body, and when the carbon dioxide sensor has detected an increase in the concentration of carbon dioxide in the store main body, an abnormality occurring in the store main body may be detected. In such a case (when an undesirable abnormality is detected when the store main body is opened), a configuration may be provided in which the subscriber is informed that the noise of the store main body is detected as a type of service by the service unit, or the ventilation of the store main body may be automatically executed based on the detection of the increase in the concentration of carbon dioxide in the store main body.

The command receiving section 276 receives a command from the management server 3. The command execution section 277 executes a predetermined operation based on the command received by the command receiving section 276. This predetermined operation will be described in detail later.

The application transmission section 278 transmits, to the management server 3, an extension application that applies for the extension of the reservation time by the subscriber. Specifically, when receiving the extension application input from the subscriber through the touch panel 24, the application transmission section 278 transmits the extension application to the management server 3 via the Internet 6. In the present embodiment, the touch panel 24 functions as an extension acceptance unit that accepts an extension application input by the subscriber.

When the imaging unit 25 detects the presence of the subscriber, the presence notification section 279 notifies the management server 3 of the presence of the subscriber via the Internet 6.

Figure 3:
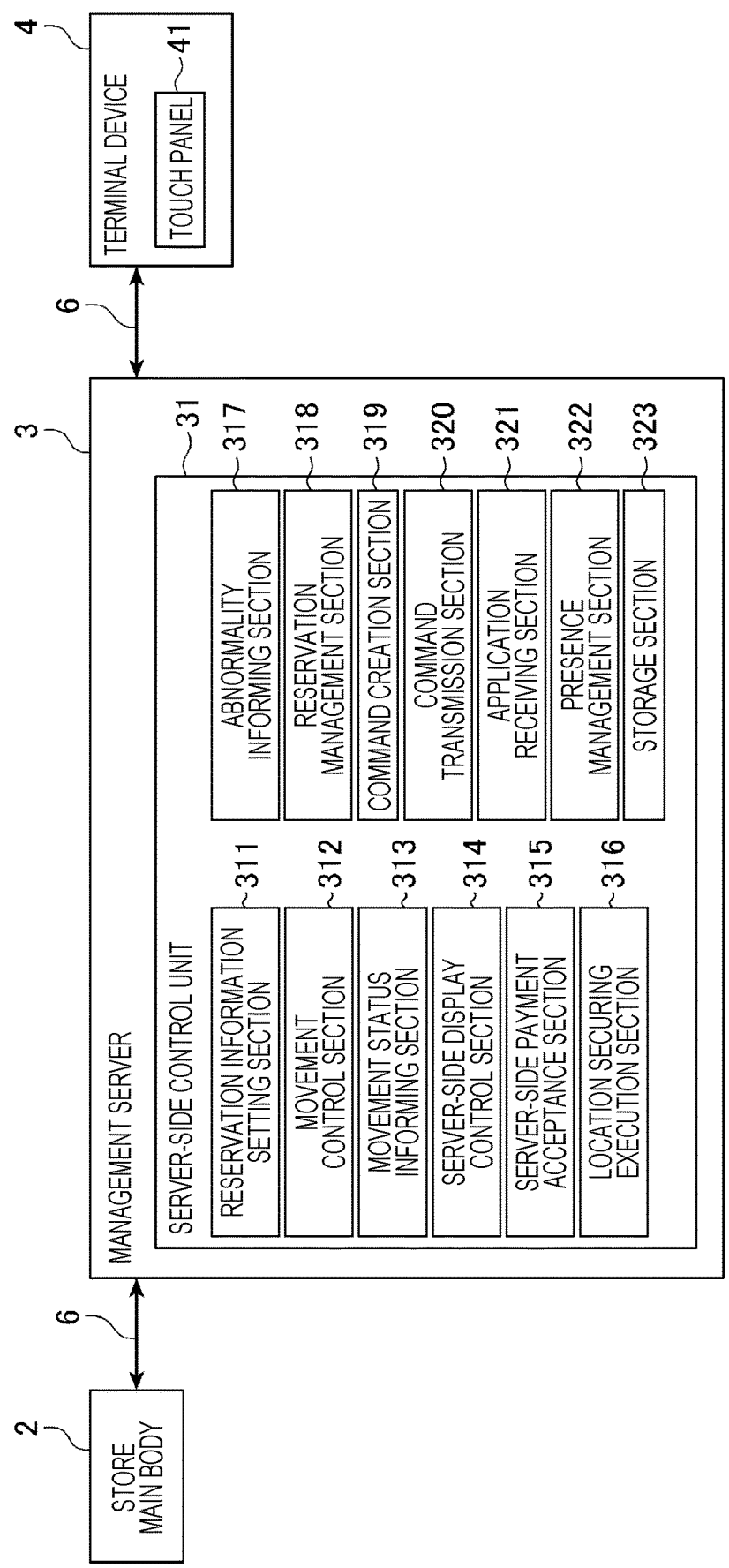
FIG. 3 is a schematic diagram showing functions of a management server and a terminal device.

FIG. 3 is a schematic diagram showing functions of the management server and the terminal device. As shown in FIG. 3, the terminal device 4 includes a touch panel 41. The touch panel 24 receives an input of information according to an operation of the subscriber and provides predetermined information to the subscriber by an image. In other words, the touch panel 41 functions as a reservation-side display unit and a reservation-side input unit.

Note that in the present embodiment, although the reservation-side display unit and the reservation-side input unit are integrally mounted on the terminal device 4 by the touch panel 41, the reservation-side display unit and the reservation-side input unit may be individually mounted, or a display device or an input device different from the touch panel 41 may be adopted. In short, the reservation-side display unit only has to be able to display information, and the reservation-side input unit only has to be able to receive an operation input. In addition, instead of the function of displaying information, information may be transmitted to the subscriber using voices, hologram, VR, AR, or the like, or instead of the function of receiving an operation input, an input of information from the subscriber may be received using voices, hologram, VR, AR, or the like.

The management server 3 includes a server-side control unit 31. The server-side control unit 31 includes a CPU, a memory, and the like, and executes information processes according to a predetermined program stored in the memory. The server-side control unit 31 includes a reservation information setting section 311, a movement control section 312, a movement status informing section 313, a server-side display control section 314, a server-side payment acceptance section 315, a location securing execution section 316, an abnormality informing section 317, a reservation management section 318, a command creation section 319, a command transmission section 320, an application receiving section 321, a presence management section 322, and a storage section 323.

The reservation information setting section 311 receives the reservation of the store main body 2 through terminal device 4, and stores and sets the reservation information on the subscriber, the reservation location, and the reservation date and time (reservation start time and reservation end time) in the storage section 323. Here, the server-side display control section 314 causes the touch panel 41 of the terminal device 4 to display the commodity housed in the housing unit 21.

Note that in the present embodiment, although the server-side display control section 314 displays the commodity housed in the housing unit 21 on the touch panel 41 of the terminal device 4, the server-side display control section 314 does not necessarily have to display the commodity housed in the housing unit 21 on the touch panel 41 of the terminal device 4.

The movement control section 312 causes the moving unit 23 to move the store main body 2 to the reservation location on the reservation date and time (reservation start time) based on the reservation information. The movement status informing section 313 informs the subscriber of the movement status of the store main body 2. Specifically, the movement status informing section 313 informs the subscriber of the movement status such as the present position of the store main body 2 and the estimated arrival time at the reservation location.

In addition, the server-side display control section 314 described above causes the touch panel 41 of the terminal device 4 to display the provision amount of a commodity provided to the subscriber based on the presence or absence of the provision of the commodity determined by the provision determination section 263 of the store main body 2 described above.

The server-side payment acceptance section 315 accepts a payment according to the amount of the commodity provided to the subscriber through the touch panel 41 of the terminal device 4. Here, the above-described closure determination section 266 of the store main body 2 determines whether the housing unit 21 is closed by the closing unit 22 after the payment is accepted by the server-side payment acceptance section 315.

The location securing execution section 316 secures a reservation location based on the reservation information. Specifically, when the parking lot or the like is set as the reservation location, the location securing execution section 316 automatically secures the reservation location and pays a parking fee.

When the abnormality notification section 271 of the store main body 2 informs the abnormality, the abnormality informing section 317 informs the administrator of the abnormality of the store main body 2. Specifically, the abnormality informing section 317 informs the administrator of the abnormality of the store main body 2 through a display device (not shown) connected to the management server 3. The reservation management section 318 manages the reservation information including the reservation start time and the reservation end time set by reservation information setting section 311.

The command creation section 319 creates a command to the store main body 2. Specifically, the command creation section 319 creates various commands such as an informing command that informs the reservation end time, an extension command that informs whether the reservation time can be extended according to the reservation status, and a warning command that informs the subscriber of a warning when the subscriber is present even at reservation end time or later. The command transmission section 320 transmits a command to the store main body 2 via the Internet 6.

The application receiving section 321 receives the extension application transmitted from the application transmission section 278 of the store main body 2. Then, the reservation management section 318 updates the reservation information by changing the reservation end time based on the extension application received by the application receiving section 321. The presence management section 322 stores and manages the presence information of the subscriber notified by the presence notification section 279 in the storage section 323.

Note that although the storage section 323 is formed of the memory of the server-side control unit 31, the storage section 323 may be formed of a hard disk drive (HDD), a network attached storage (NAS), or the like, or may be formed with a cloud service. In addition, although the functions of the server-side control unit 31 are executed according to a program stored in the storage section 323, the functions may be formed with independent devices or by cloud computing.

Figure 4:
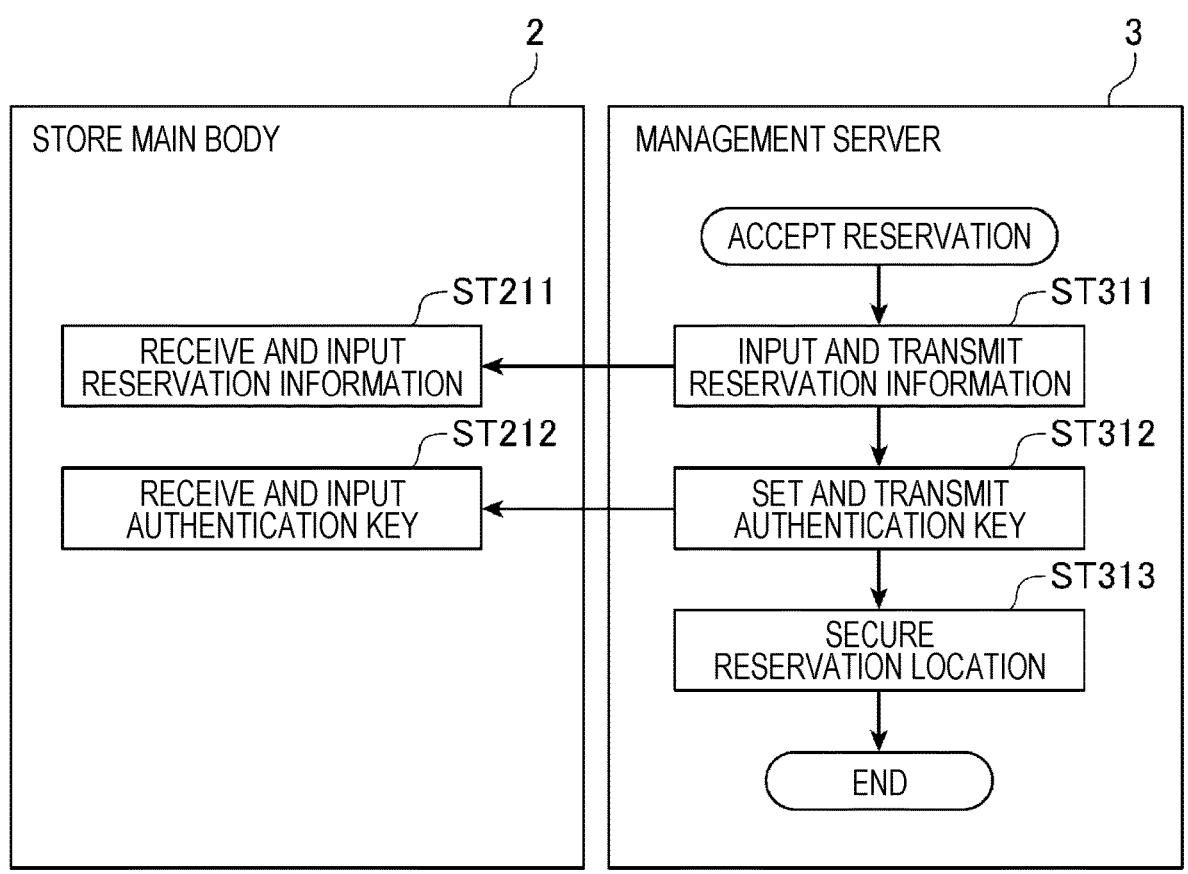
FIG. 4 is a flowchart showing operations of the store main body and the management server when a reservation of the store main body is accepted.

FIG. 4 is a flowchart showing operations of the store main body and the management server when the reservation of the store main body is accepted. As shown in FIG. 4, the unmanned-mobile store management system 1 executes the processes in Steps ST211 and ST212, and Steps ST311 to ST313 according to a predetermined program stored in the memory.

As described above, the subscriber can access the management server 3 or the reservation site 5 via the Internet 6 using the terminal device 4, specify the use time, and reserve the store main body 2. Note that in the present embodiment, a configuration is provided such that the subscriber accesses the management server 3 or the reservation site 5 via the Internet 6 using the terminal device 4 and reserves the store main body 2 by specifying the use time. However, a configuration may be provided such that the subscriber accesses only one of the management server 3 and the reservation site 5 and reserves the store main body 2.

The reservation information setting section 311 of the management server 3 receives the reservation of the store main body 2 through the terminal device 4, and stores and sets the reservation information on the subscriber, the reservation location, and the reservation date and time (reservation start time and reservation end time) in the storage section 323 (Step ST311). In addition, in Step ST311, the reservation information setting section 311 transmits the reservation information stored in the storage section 323 to the store main body 2. When receiving the reservation information transmitted from the management server 3 in Step ST311, the store-side control unit 26 of the store main body 2 stores and sets the reservation information in the storage section 280 (Step ST211).

After executing Step ST311, the server-side control unit 31 of the management server 3 issues an authentication key corresponding to the closing unit 22 of the store main body 2 regarding the reservation information, and transmits the authentication key to the store main body 2 and the terminal device 4 of the subscriber in association with the reservation information (Step ST312).

When receiving the reservation information including the authentication key transmitted from the management server 3 in Step ST312, the store-side control unit 26 of the store main body 2 stores and sets the reservation information in the storage section 280 (Step ST212).

After executing Step ST312, the location securing execution section 316 of the management server 3 secures a reservation location based on the reservation information (Step ST313). Specifically, when the parking lot or the like is set as the reservation location, the location securing execution section 316 automatically secures the reservation location and pays a parking fee. After that, the server-side control unit 31 of the management server 3 ends the process of the store main body 2 and the management server 3 when accepting the reservation of the store main body 2.

Figure 5:
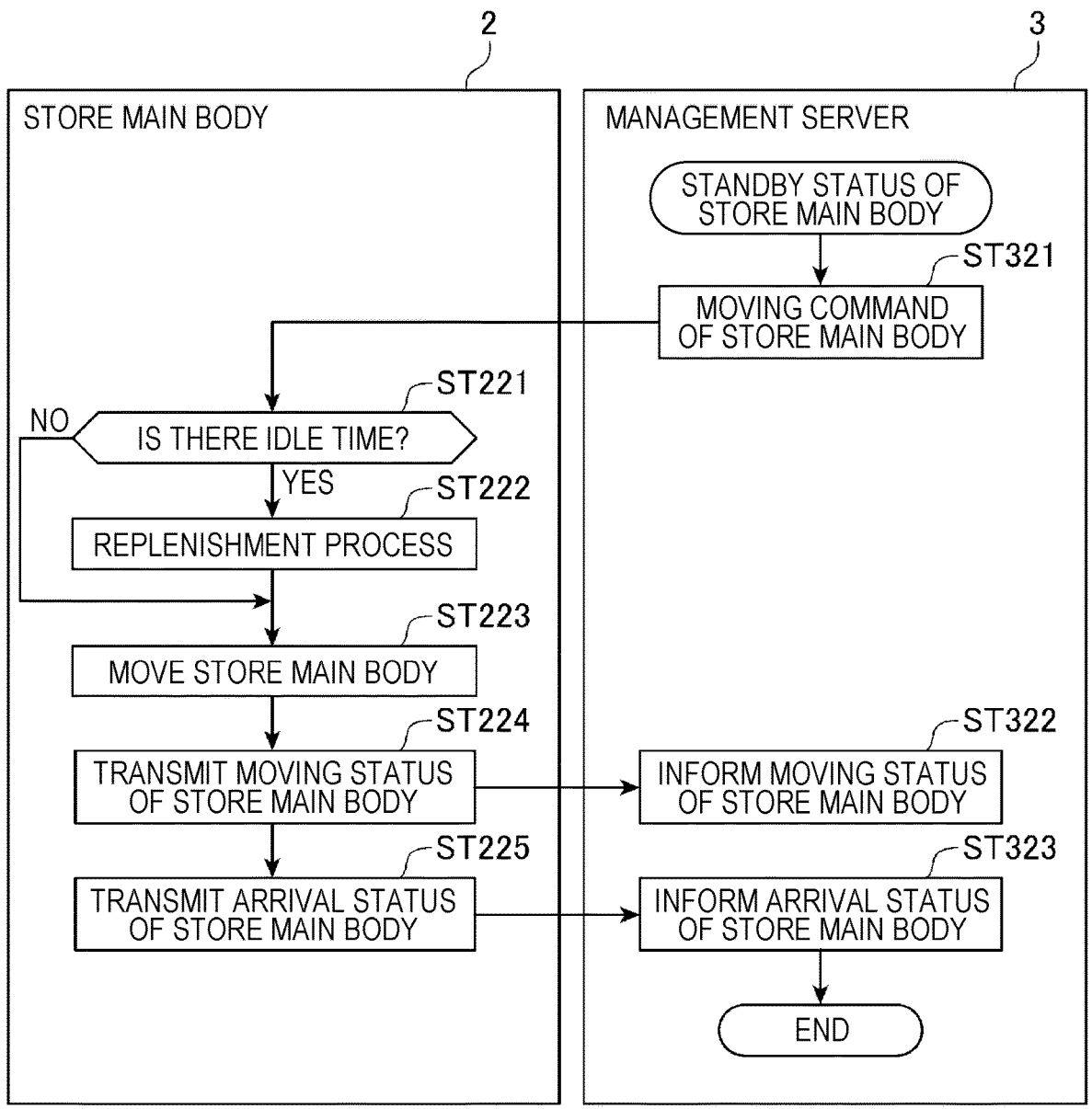
FIG. 5 is a flowchart showing operations of the store main body and the management server where the store main body is in standby status.

FIG. 5 is a flowchart showing operations of the store main body and the management server in the standby status of the store main body. As shown in FIG. 5, the unmanned-mobile store management system 1 executes the processes in Steps ST221 to ST225 and Steps ST321 to ST323 according to a predetermined program stored in the memory. In the standby status of the store main body 2, the movement control section 312 of the management server 3 creates a movement command that causes the moving unit 23 to move the store main body 2 to the reservation location on the reservation date and time (reservation start time) based on the reservation information, and transmits the movement command to the store main body 2 (Step ST321).

Here, the server-side control unit 31 refers to the operation information indicating the operation status of the store main body 2 to determine whether the store main body 2 is in the standby status. The operation information is stored in the storage section 323 in association with the store main body 2. Then, when the movement command is transmitted to the store main body 2 in Step ST321, the server-side control unit 31 updates the operation information stored in the storage section 323 to the operation status. As a result, the server-side control unit 31 brings the store main body 2 into operating status.

When receiving the movement command transmitted from the management server 3 in Step ST321, the store-side control unit 26 of the store main body 2 determines whether there is idle time before the next reservation start time based on the reservation information (Step ST221). Specifically, the store-side control unit 26 determines that there is idle time when there is time to execute the replenishment of the stock of the commodity or the replenishment of energy before the next reservation start time, and determines that there is no idle time when there is no time to execute these.

When it is determined in Step ST221 that there is no idle time, the store-side control unit 26 of the store main body 2 executes the processes in Step ST223 and the subsequent steps. On the other hand, when it is determined in Step ST221 that there is idle time, the store-side control unit 26 of the store main body 2 executes the replenishment process in Step ST222.

In the replenishment process in Step ST222, the stock determination section 267 of the store main body 2 determines whether the stock of the commodity housed in the housing unit 21 is insufficient. Then, when the stock determination section 267 determines that the stock of the commodity is insufficient, the stock replenishment execution section 268 replenishes the stock of the commodity housed in the housing unit 21.

In addition, in the replenishment process in Step ST222, the energy determination section 269 of the store main body 2 determines whether energy (fuel, electric power, and the like) of the store main body 2 is insufficient. Then, when the energy determination section 269 determines that the energy is insufficient, the energy replenishment execution section 270 replenishes energy of the store main body 2.

After executing the replenishment process in Step ST222, or when it is determined in Step ST221 that there is no idle time, the store-side control unit 26 of the store main body 2 executes the movement of the store main body 2 to the reservation location on the reservation date and time (reservation start time) (Step ST223).

After executing the process in Step ST223, the store-side control unit 26 of the store main body 2 transmits the movement status of the store main body 2 to the management server 3 (Step ST224). Note that while the store main body 2 is moving, the store-side control unit 26 periodically notifies the movement status of the store main body 2.

When receiving the movement status transmitted from the store main body 2 in Step ST224, the movement status informing section 313 of the management server 3 informs the movement status of the store main body 2 to the subscriber (Step ST322). Specifically, the movement status informing section 313 informs the subscriber of the movement status such as the present position of the store main body 2 and the estimated arrival time at the reservation location.

When the store main body 2 arrives at the reservation location after executing the process in Step ST224, the store-side control unit 26 of the store main body 2 transmits the arrival status of the store main body 2 to the management server 3 (Step ST225). When receiving the arrival status transmitted from the store main body 2 in Step ST225, the movement status informing section 313 of the management server 3 informs the subscriber of the arrival status of the store main body 2 (Step ST323). After that, the server-side control unit 31 of the management server 3 ends the process of the store main body 2 and the management server 3 in the standby status of the store main body.

Figure 6:
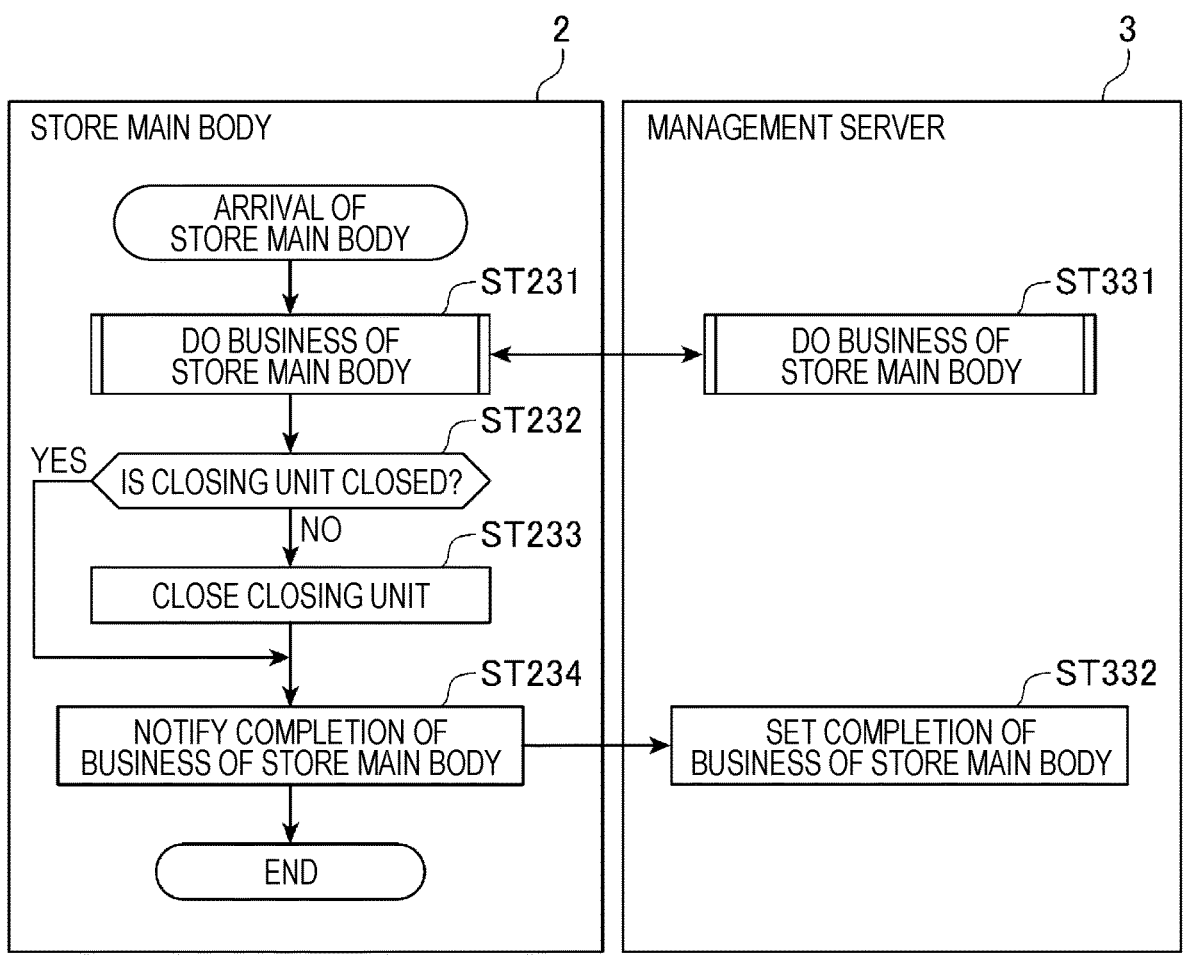
FIG. 6 is a flowchart showing operations of the store main body and the management server after the arrival of the store main body.

FIG. 6 is a flowchart showing operations of the store main body and the management server after the arrival of the store main body. As shown in FIG. 6, the unmanned-mobile store management system 1 executes the processes in Steps ST231 to ST234, 331, and 332 according to a predetermined program stored in the memory.

After the arrival of the store main body 2, the store-side control unit 26 of the store main body 2 conducts business of the store main body 2 (Step ST231). In addition, the server-side control unit 31 of the management server 3 conducts business of the store main body 2 (Step ST331).

Specifically, the store-side control unit 26 of the store main body 2 and the server-side control unit 31 of the management server 3 do business of the store main body 2 in cooperation with each other by transmitting and receiving information to and from each other.

Figure 7:
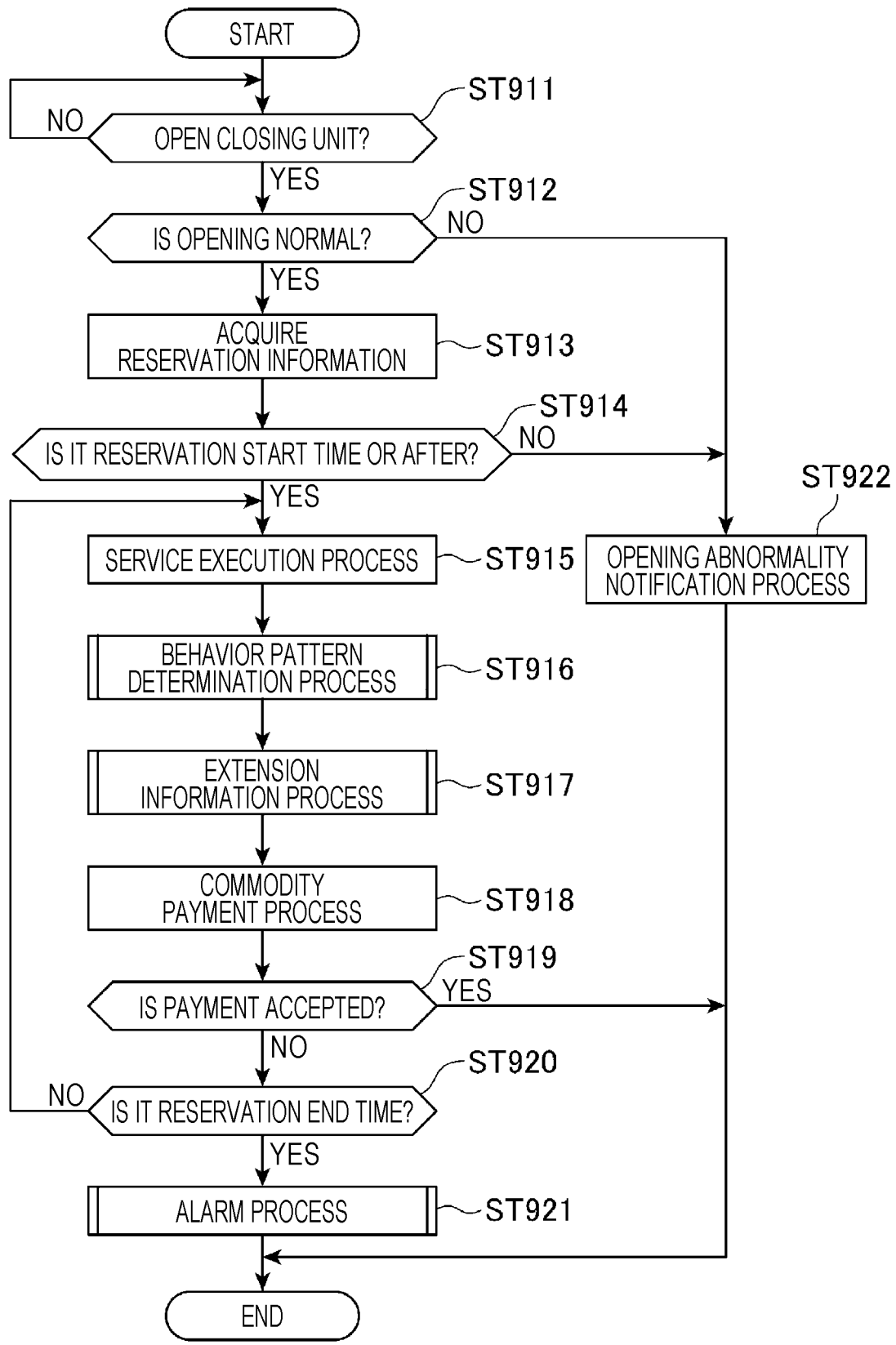
FIG. 7 is a flowchart showing an operation of conducting business of a store main body.

FIG. 7 is a flowchart showing an operation of conducting business of the store main body. As shown in FIG. 7, the store main body 2 and the management server 3 execute the business process of the store main body in Step ST911 to 922 according to a predetermined program stored in the memory. Note that in the present embodiment, the operation of the store main body 2 and the operation of the management server 3 are collectively referred to as the operation of the unmanned-mobile store management system 1, and this will be described using a common flowchart.

First, the store-side control unit 26 of the store main body 2 determines whether the closing unit 22 is opened (Step ST911). Here, when the subscriber determination section 261 determines that a visitor is a subscriber, i.e., when the input of the authentication key is normally received through the touch panel 24, the opening setting section 262 opens the closing unit 22 to provide the commodity housed in the housing unit 21.

When it is determined in Step ST911 that the closing unit 22 is not opened, the store-side control unit 26 repeatedly executes the process in Step ST911. On the other hand, when it is determined in Step ST911 that the closing unit 22 is opened, the subscriber determination section 261 normally accepts an input of an authentication key through the touch panel 24 to determine whether the closing unit 22 is normally opened (Step ST912).

When it is determined in Step ST912 that the closing unit 22 is not normally opened, the store-side control unit 26 executes an opening abnormality notification process in Step ST922 to be described later. The opening abnormality notification process in Step ST922 will be described in detail later. On the other hand, when it is determined in Step ST912 that the closing unit 22 is normally opened, the subscriber determination section 261 acquires reservation information from the storage section 280 (Step ST913).

After acquiring the reservation information from the storage section 280, the subscriber determination section 261 determines whether the time when the closing unit 22 is normally opened is at the reservation start time or later based on the reservation information (Step ST914).

When it is determined in Step ST914 that it is not the reservation start time or later, the store-side control unit 26 executes the opening abnormality notification process in Step ST922 described later. The opening abnormality notification process in Step ST922 will be described in detail later.

On the other hand, when it is determined in Step ST914 that it is the reservation start time or later, i.e., when the subscriber determination section 261 determines that the closing unit 22 is normally opened at the reservation start time or later, the service execution section 273 executes the service with the touch panel 24 (Step ST915: service executing process). Specifically, the service execution section 273 displays the selling points of the commodity housed in the housing unit 21 on the display screen of the touch panel 24, and starts the explanation to the subscriber.

After executing the service execution process in Step ST915, the store-side control unit 26 executes a behavior pattern determination process in Step ST916 and executes an extension informing process in Step ST917. Note that the behavior pattern determination process in Step ST916 and the extension informing process in Step ST917 will be described in detail later.

After executing the extension informing process in Step ST917, the store-side control unit 26 executes a payment of the commodity with the touch panel 24, and the server-side control unit 31 executes the payment of the commodity with the touch panel 41 (Step ST918: commodity payment process).

Specifically, in the commodity payment process in Step ST918, the store-side display control section 264 causes the touch panel 24 to display the provision amount of the commodity provided to the subscriber based on the presence or absence of provision of the commodity determined by the provision determination section 263. Then, the store-side payment acceptance section 265 accepts the payment according to the amount of the commodity provided to the subscriber through the touch panel 24.

In addition, in the commodity payment process in Step ST918, the server-side display control section 314 displays the provision amount of the commodity provided to the subscriber on the touch panel 41 of the terminal device 4 based on the presence or absence of the provision of the commodity determined by the provision determination section 263 of the store main body 2. Then, the server-side payment acceptance section 315 accepts the payment according to the amount of the commodity provided to the subscriber through the touch panel 41 of the terminal device 4.

After executing the commodity payment process in Step ST918, the store-side control unit 26 determines whether the payment according to the amount of the commodity provided to the subscriber is accepted (Step ST919). When it is determined in Step ST919 that the payment is accepted, the store main body 2 and the management server 3 end the business process of the store main body without executing the processes in Step ST920 and the subsequent steps.

On the other hand, when it is determined in Step ST919 that no payment is accepted, the store-side control unit 26 determines whether the current time is at reservation end time or later (Step ST920). When it is determined in Step ST920 that it is not reservation end time or later, the store-side control unit 26 repeatedly executes the processes in Step ST915 and the subsequent steps described above.

On the other hand, when it is determined in Step ST920 that it is reservation end time or later, the store-side control unit 26 executes the alarm process in Step ST921. After that, the store main body 2 and the management server 3 end the business process of the store main body. Note that the alarm process in Step ST921 will be described in detail later.

In addition, when it is determined in Step ST912 that the closing unit 22 is not normally opened, and when it is determined in Step ST914 that it is not the reservation start time or later, the store-side control unit 26 executes the opening abnormality notification process in Step ST922 as described above. In other words, when the store-side control unit 26 detects an abnormality occurring in the store main body 2, the store-side control unit executes the opening abnormality notification process in Step ST922.

In the opening abnormality notification process in Step ST922, the abnormality notification section 271 of the store main body 2 notifies the management server 3 of the abnormality of the store main body 2 via the Internet 6. Then, when the abnormality notification section 271 notifies the abnormality of the store main body 2, the abnormality informing section 317 of the management server 3 informs the administrator of the abnormality of the store main body 2. Specifically, the abnormality informing section 317 informs the administrator of the abnormality of the store main body 2 through a display device (not shown) connected to the management server 3.

Behavior Pattern Determination Process

Figure 8:
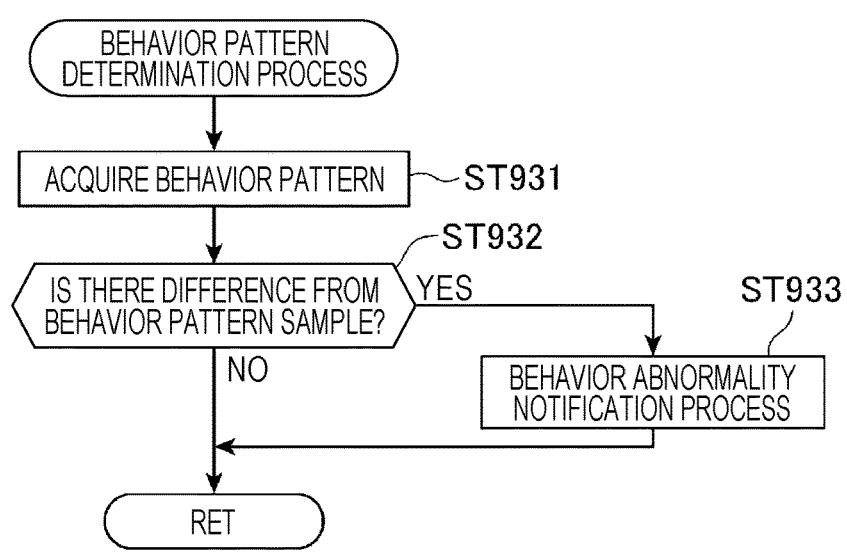
FIG. 8 is a flowchart showing a behavior pattern determination process.

FIG. 8 is a flowchart showing the behavior pattern determination process. As shown in FIG. 8, the store-side control unit 26 executes the behavior pattern determination process in Steps ST931 to 933 according to a predetermined program stored in the memory. In the behavior pattern determination process, the behavior pattern acquisition section 274 acquires the behavior pattern of the subscriber based on the image captured by the imaging unit 25 (Step ST931).

After acquiring the behavior patterns of the subscriber in Step ST931, the behavior pattern determination section 275 compares a plurality of samples of the behavior patterns stored in the storage section 280 with the behavior patterns acquired by the behavior pattern acquisition section 274, and determines whether there is a difference (Step ST932).

When it is determined in Step ST932 that there is no difference, the store-side control unit 26 ends the behavior pattern determination process. On the other hand, when it is determined in Step ST932 that there is a difference, the store-side control unit 26 executes the behavior abnormality notification process in Step ST933. In other words, when the store-side control unit 26 detects an abnormality occurring in the store main body 2, the store-side control unit executes the behavior abnormality notification process in Step ST933.

In the behavior abnormality notification process in Step ST933, the abnormality notification section 271 of the store main body 2 notifies the management server 3 of the abnormality of the store main body 2 via the Internet 6. Then, when the abnormality notification section 271 notifies the abnormality of the store main body 2, the abnormality informing section 317 of the management server 3 informs the administrator of the abnormality of the store main body 2. Specifically, the abnormality informing section 317 informs the administrator of the abnormality of the store main body 2 through a display device (not shown) connected to the management server 3.

Extension Informing Process

Figure 9:
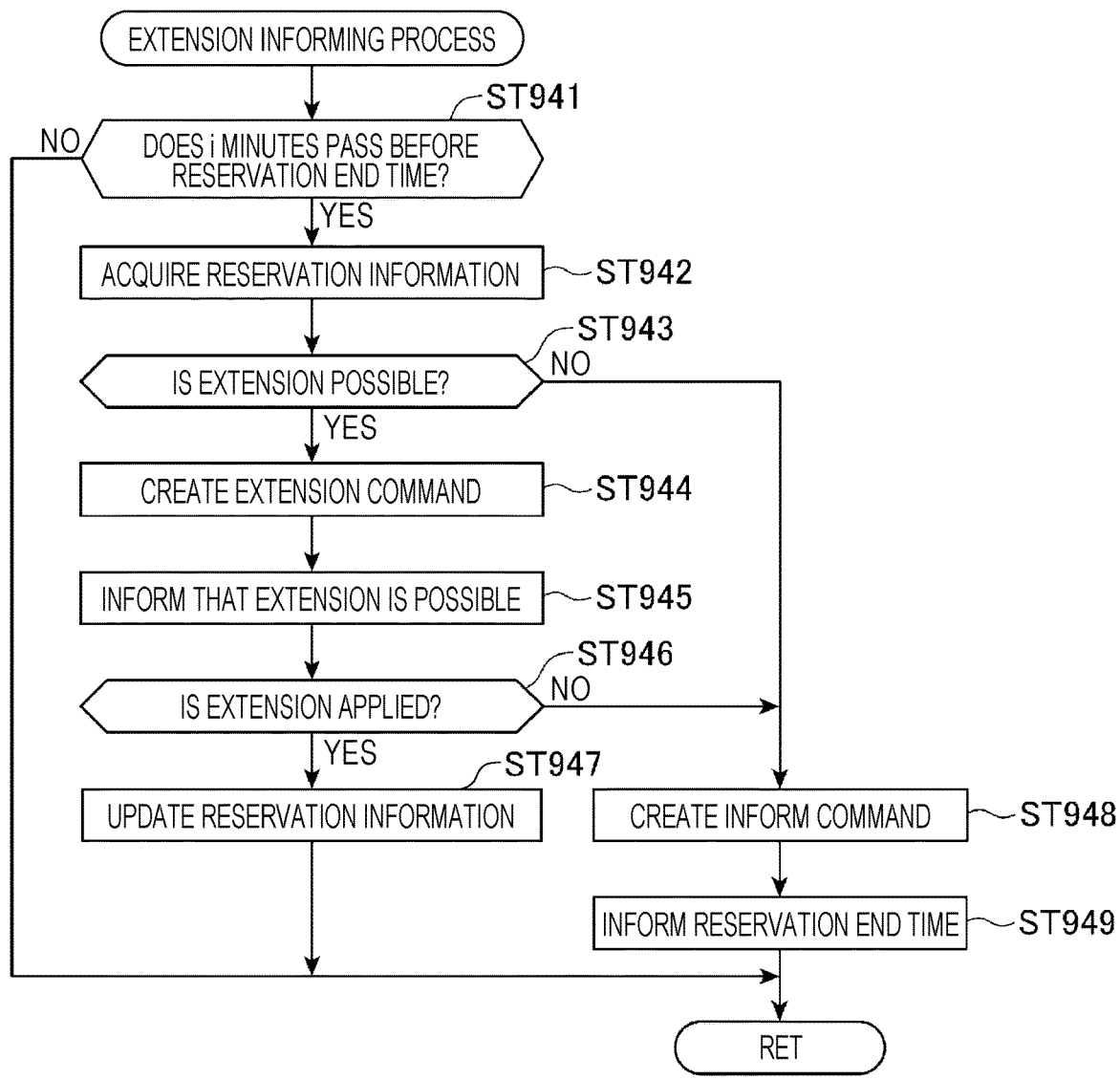
FIG. 9 is a flowchart showing an extension informing process.

FIG. 9 is a flowchart showing an extension informing process. As shown in FIG. 9, the server-side control unit 31 of the management server 3 executes the extension informing process in Steps ST941 to 949 according to a predetermined program stored in the memory. In the extension informing process, the server-side control unit 31 determines whether it is predetermined time i (the time set by the administrator, for example, ten minutes) before the reservation end time has elapsed (Step ST941).

When it is determined in Step ST941 that the time has elapsed, the server-side control unit 31 acquires reservation information from the storage section 323 (Step ST942). After acquiring the reservation information from the storage section 323, the server-side control unit 31 checks whether there is idle time that is predetermined time (e.g., 30 minutes) or longer after reservation end time or later based on the reservation information, and determines whether the reservation time can be extended (Step ST943).

When it is determined in Step ST943 that the reservation time can be extended, the command creation section 319 creates a command for the store main body 2 based on the reservation information. Specifically, the command creation section 319 creates an extension command that informs whether to extend the reserved time according to the reservation status (Step ST944). In the present embodiment, the command creation section 319 creates, as extension commands, availability information indicating that "the reserved time can be extended" as information indicating that the reserved time can be extended, and extension time information indicating that "the reserved time can be extended up to two hours" as extendable time. Then, the command transmission section 320 transmits the extension command to the store main body 2 via the Internet 6.

After that, the command receiving section 276 of the store main body 2 receives the extension command from the management server 3. Then, the command execution section 277 executes a predetermined operation based on the extension command received by the command receiving section 276. Specifically, the command execution section 277 causes the display screen of the touch panel 24 to display information such that "the reservation time can be extended", "the reservation time can be extended up to two hours", and "when the reservation time is extended, please apply for extension from the screen" to inform the subscriber (Step ST945).

After informing the subscriber that the reservation time can be extended, the store-side control unit 26 determines whether the input of the extension application by the subscriber is received through the touch panel 24 (Step ST946).

When it is determined in Step ST946 that the input of the extension application by the subscriber is received, the application transmission section 278 transmits, to the management server 3, an extension application that applies for extension of the reservation time by the subscriber. In other words, when receiving the extension application input from the subscriber through the touch panel 24, the application transmission section 278 transmits the extension application to the management server 3 via the Internet 6. Therefore, in the present embodiment, the touch panel 24 functions as an extension acceptance unit that accepts an extension application input by the subscriber.

When the application transmission section 278 transmits the extension application, the application receiving section 321 of the management server 3 receives the extension application transmitted from the application transmission section 278 of the store main body 2. Then, the reservation management section 318 updates the reservation information by changing the reservation end time based on the extension application received by the application receiving section 321 (Step ST947). After that, the store main body 2 and the management server 3 end the extension informing process.

On the other hand, when it is determined in Step ST946 that the input of the extension application by the subscriber is not accepted (when the subscriber selects no extension of the reservation time, or when the operation of touch panel 24 is not detected during predetermined time, or the like), the application transmission section 278 transmits a non-extension application to the management server 3 instead of the extension application for applying for extension of the reservation time by the subscriber.

When the non-extension application is transmitted by the application transmission section 278, the application receiving section 321 of the management server 3 receives the non-extension application transmitted from the application transmission section 278 of the store main body 2. Then, the command creation section 319 creates a command to the store main body 2 based on the reservation information. Specifically, the command creation section 319 creates an informing command that informs the reservation end time (Step ST948). Then, the command transmission section 320 transmits the informing command to the store main body 2 via the Internet 6.

After that, the command receiving section 276 of the store main body 2 receives the informing command from the management server 3. Then, the command execution section 277 executes a predetermined operation based on the informing command received by the command receiving section 276. Specifically, the command execution section 277 causes the display screen of the touch panel 24 to display information of "i minutes left until the reservation end time" to inform the subscriber of the reservation end time (Step ST949). After that, the store main body 2 and the management server 3 end the extension informing process.

Note that as a unit that informs the subscriber of the reservation end time, the reservation end time may be informed by being displayed on the display screen of the touch panel 24, for example, by sounding an alarm, or may be informed by gradually darkening the illumination of the store main body 2.

Warning Process

Figure 10:
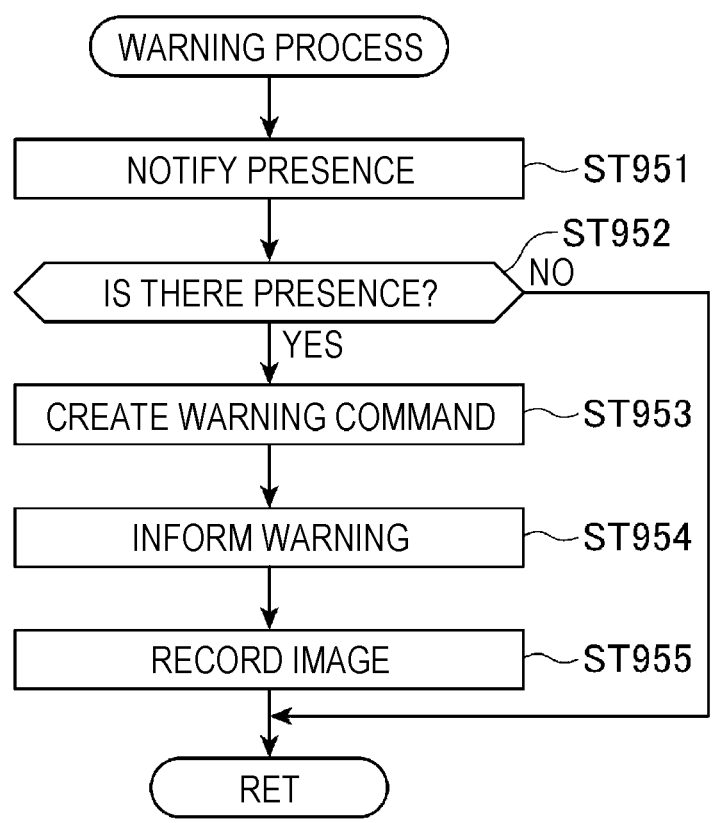
FIG. 10 is a flowchart showing a warning process.

FIG. 10 is a flowchart showing the warning process. As shown in FIG. 10, the server-side control unit 31 of the management server 3 executes the warning process in Steps ST951 to 955 according to a predetermined program stored in the memory.

In the warning process, when the imaging unit 25 detects the presence of the subscriber, the presence notification section 279 of the store main body 2 notifies the management server 3 of the presence of the subscriber via the Internet 6 (Step ST951).

When the presence of the subscriber is notified to the management server 3 via the Internet 6 in Step ST951, the presence management section 322 of the management server 3 stores and manages the presence information of the subscriber notified by the presence notification section 279 in the storage section 323. Then, based on the presence information stored in the storage section 323, the server-side control unit 31 of the management server 3 determines whether a subscriber is present in the store main body 2 at reservation end time or later (Step ST952).

When it is determined in Step ST952 that there is no subscriber in the store main body 2 at reservation end time or later, the store main body 2 and the management server 3 end the warning process without executing the processes in Step ST953 and the subsequent steps.

On the other hand, when it is determined in Step ST952 that a subscriber is present in the store main body 2 at reservation end time or later, the command creation section 319 creates a command to the store main body 2 based on the reservation information. Specifically, the command creation section 319 creates a warning command that informs the subscriber of a warning (Step ST953). Then, the command transmission section 320 transmits a warning command to the store main body 2 via the Internet 6.

After that, the command receiving section 276 of the store main body 2 receives the warning command from the management server 3. Then, the command execution section 277 executes a predetermined operation based on the warning command received by the command receiving section 276. Specifically, the command execution section 277 displays information of "the reservation end time has ended" on the display screen of the touch panel 24 to inform the subscriber that the reservation end time has ended (Step ST954). In addition, the command execution section 277 captures an image of the store main body 2 by the imaging unit 25 and stores the image in the storage section 280 (Step ST955). After that, the store main body 2 and the management server 3 end the warning process.

Returning to FIG. 6, operations of the store main body and the management server after the arrival of the store main body will be further described. After conducting the business of the store main body 2, i.e., after finishing the business process of the store main body, the closure determination section 266 of the store main body 2 determines whether the housing unit 21 is closed by the closing unit 22 (Step ST232).

When it is determined in Step ST232 that the housing unit 21 is not closed, the closure determination section 266 automatically closes the closing unit 22 and causes the commodity housed in the housing unit 21 not to be provided (Step ST233).

After executing the process in Step ST233 or when it is determined in Step ST232 that the housing unit 21 is closed, the store-side control unit 26 notifies the management server 3 of the completion of business of the store main body 2 via the Internet 6 (Step ST234). After that, the store-side control unit 26 brings the store main body 2 into standby status.

When the store-side control unit 26 is notified of the completion of the operation of the store main body 2, the server-side control unit 31 executes the setting of the completion of the operation of the store main body 2 (Step ST332). Specifically, the server-side control unit 31 updates the operation information stored in the storage section 323 to the standby status. As a result, the server-side control unit 31 sets the store main body 2 to the standby status.

According to the present embodiment as described above, the following operations and effects can be achieved.

(1) The store main body 2 includes the housing unit 21 that stores a commodity, and the closing unit 22 that closes the commodity housed in the housing unit 21 such that the commodity is not allowed be provided. In addition, the management server 3 includes the reservation information setting section 311 that stores and sets reservation information regarding a reservation location in the storage section 280, and the movement control section 312 that causes the moving unit 23 to move the store main body 2 to the reservation location based on the reservation information set by the reservation information setting section 311. Therefore, this enables the store main body 2 to move to a predetermined location in an unmanned manner, and the subscriber can actually confirm the commodity stored in the store main body 2 by going to the reservation location or waiting at the reservation location.

(2) Since the movement control section 312 causes the moving unit 23 to move the store main body 2 to the reservation location on the reservation date and time based on the reservation information, this enables the store main body 2 to move to a predetermined location at predetermined time in an unmanned manner, and the subscriber can actually confirm the commodity stored in the store main body 2 by going to the reservation location on the reservation date and time or waiting at the reservation location.

(3) Since the server-side control unit 31 includes the movement status informing section 313 that informs the subscriber of the movement status of the store main body 2, this enables the subscriber to easily grasp the movement status of the store main body 2, and confirm the present position of the store main body 2, the estimated arrival time to the reservation location, and the like.

(4) The store-side control unit 26 includes the subscriber determination section 261 that determines whether a visitor is a subscriber based on reservation information, and the opening setting section 262 that opens the closing unit 22 to provide the commodity housed in the housing unit 21 when the subscriber determination section 261 determines that a visitor is the subscriber. Therefore, this enables the subscriber to receive the commodity housed in the housing unit 21 by going to the reservation location or waiting at the reservation location.

(5) Since the store-side control unit 26 includes the provision determination section 263 that determines whether the commodity housed in the housing unit 21 is provided, it is possible to grasp the amount of a commodity provided to the subscriber when the closing unit 22 is opened to provide the commodity housed in the housing unit 21. Therefore, the store main body 2 can count, for example, the sales amount of the article, the service provision time, and the like, and execute the billing to the subscriber.

(6) The store-side control unit 26 includes the store-side display control section 264 that causes the touch panel 24 to display the provision amount of the commodity provided to the subscriber based on the presence or absence of the provision of the commodity determined by the provision determination section 263, and the store-side payment acceptance section 265 that accepts a payment according to the provision amount of the commodity provided to the subscriber through the touch panel 24. Therefore, this enables the subscriber to make a payment according to the provision amount of the commodity through the touch panel 24.

(7) The server-side control unit 31 includes the server-side display control section 314 that causes the touch panel 41 to display the provision amount of the commodity provided to the subscriber based on the presence or absence of the provision of the commodity determined by the provision determination section 263 and the server-side payment acceptance section 315 that accepts a payment according to the provision amount of the commodity provided to the subscriber through the touch panel 41. Therefore, this enables the subscriber to make a payment according to the provision amount of the commodity through the touch panel 41.

(8) Since the store-side control unit 26 includes the closure determination section 266 that determines whether the housing unit 21 is closed by the closing unit 22, for example, it is determined whether the housing unit 21 is closed by the closing unit 22 at the reservation end time, and when a determination is made that the housing unit 21 is not closed, the housing unit 21 can be automatically closed by the closing unit 22.

(9) Since the server-side control unit 31 includes the location securing execution section 316 that secures the reservation location based on the reservation information, for example. Therefore, even when a parking lot or the like is used as the reservation location, it is possible to automatically secure the reservation location and pay the parking fee.

(10) The store-side control unit 26 includes the stock determination section 267 that determines whether the stock of the commodity housed in the housing unit 21 is insufficient, and the stock replenishment execution section 268 that replenishes the stock of the commodity housed in the housing unit 21 when the stock determination section 267 determines that the stock of the commodity is insufficient. Therefore, it is possible to automatically execute the replenishment of the stock of the commodity housed in the housing unit 21.

(11) Since the store-side control unit 26 includes the energy determination section 269 that determines whether the energy of the store main body 2 is insufficient and the energy replenishment execution section 270 that replenishes the energy of the store main body 2 when the energy determination section 269 determines that the energy is insufficient. Therefore, it is possible to automatically replenish the energy of the store main body 2.

(12) Since the server-side control unit 31 includes the server-side display control section 314 that causes the touch panel 41 to display the commodity housed in the housing unit 21, this enables the subscriber to confirm the commodity stored in the store main body 2 before reservation.

13) Since the server-side control unit 31 includes the abnormality informing section 317 that informs the administrator of the abnormality of the store main body 2 when the abnormality notification section 271 notifies the abnormality of the store main body 2, this enables the administrator to easily grasp the abnormality such as the damage of the store main body 2, the removal of the article, and the use of the device that performs the service without permission even in the unmanned-mobile store that can move to a predetermined location in an unmanned manner and can actually check the commodity such as an article and a device that performs the service.

(14) Since the store-side control unit 26 includes the normal opening determination section 272 that determines whether the closing unit 22 is normally opened and detects the abnormality occurring in the store main body 2 when a determination is made that the closing unit 22 is not normally opened, for example, unlike the subscriber who is allowed to normally open the closing unit, i.e., it is possible to detect the subscriber who is permitted by the administrator, the opening of the closing unit 22 by the intruder using an unauthorized scheme such as picking as an abnormality by the normal opening determination section 272, and it is possible to improve the safety of the store main body 2.

(15) Since the store-side control unit 26 includes the service execution section 273 that executes the service using the touch panel 24 when the normal opening determination section 272 determines that the closing unit 22 is normally opened, it is possible to execute the service using the touch panel 24 for the subscriber who is allowed to normally open the closing unit 22, i.e., the subscriber who is permitted by the administrator.

(16) The store-side control unit 26 includes the behavior pattern determination section 275 that compares the sample of the normal behavior pattern of the subscriber of the store main body 2 with the behavior pattern acquired by the behavior pattern acquisition section 274 to determine whether there is a difference, and detects an abnormality occurring in the store main body 2 when a determination is made that there is a difference. Therefore, for example, by storing a behavior pattern suitable for a normal subscriber such as looking around commodity in the storage section 280 as a normal behavior pattern, it is possible to detect an intruder with a behavior suspicious behavior pattern such as coloring commodity as an abnormality by the behavior pattern determination section 275, and it is possible to improve the safety of the store main body 2.

(17) Since the store-side control unit 26 includes the command receiving section 276 that receives a command from the command transmission section 320 and the command execution section 277 that executes a predetermined operation based on the command received by the command receiving section 276, it is possible to approach the subscriber who is looking at the commodity by executing an operation based on an appropriate command. Therefore, for example, by informing the subscriber of the reservation end time, the store-side control unit 26 can suppress excess time, can shorten the idle time until the next reservation of the subscriber, and can increase the utilization rate of the store main body 2.

(18) The command execution section 277 informs the subscriber of the reservation end time based on the informing command. Therefore, this enables the store-side control unit 26 to suppress excess time, set the idle time until the next reservation of the subscriber to be short, and increase the operating rate of the store main body 2 by notifying the subscriber of the reservation end time.

(19) Since the command execution section 277 informs the subscriber that whether the extension is possible based on the extension command, when the store main body 2 has idle time at reservation end time or later, it is possible to inform the subscriber that the extension is possible. In addition, when the store main body 2 has no idle time at reservation end time or later, it is possible to inform the subscriber that the extension is not possible.

(20) The server-side control unit 31 includes the application receiver 321 that receives the extension application transmitted from the application transmission section 278, and the reservation management section 318 changes the reservation end time based on the extension application received by the application receiving section 321 to update the reservation information. Therefore, it is possible to execute the extension process based on the extension application of the subscriber.

Second Embodiment

Figure 11:
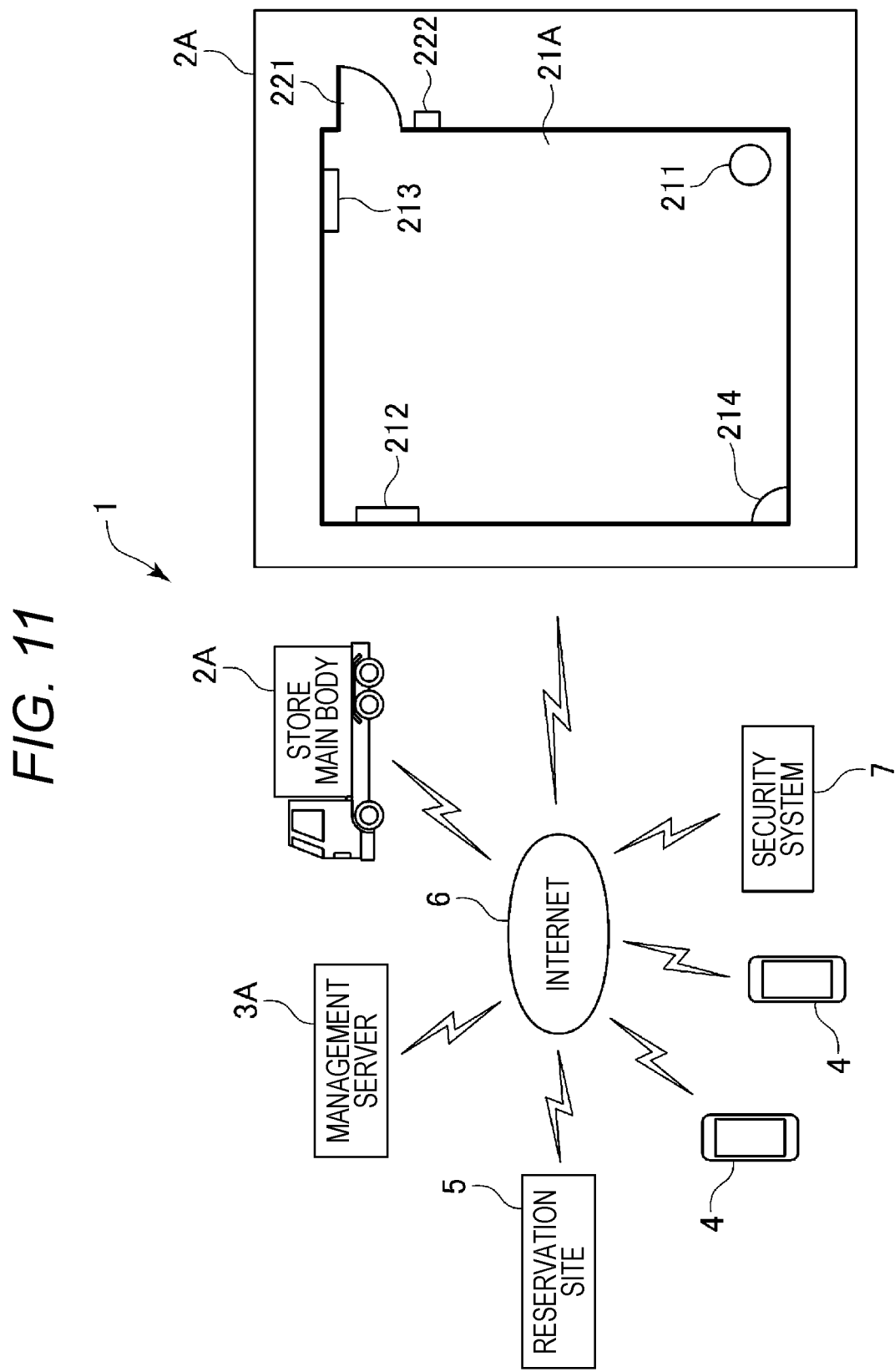
FIG. 11 is a schematic diagram of an unmanned-mobile store management system according to a second embodiment of the present disclosure.

In the following, a second embodiment of the present disclosure will be described with reference to the drawings. FIG. 11 is a schematic diagram of an unmanned-mobile store management system according to the second embodiment of the present disclosure.

In the first embodiment, the unmanned-mobile store management system 1 includes the store main body 2, the management server 3, the terminal device 4, and the reservation site 5. On the other hand, in the present embodiment, as shown in FIG. 11, an unmanned-mobile store management system 1 further includes maintenance devices 211 to 213 that execute the maintenance of a store main body 2A and an external security system 7 connected via an Internet 6. Note that in the following description, the components already described are denoted by the same reference numerals, and the description is omitted.

Here, in the present embodiment, the housing unit 21A adopts a room that stores commodities. In addition, the closing unit 22 adopts an open/close door 221 that opens and closes the room, and a lock device 222 that allows the open/close door 221 to be opened by an authentication key such as a personal identification number issued from a management server 3A to a terminal device 4 of a subscriber, a bar code, and an optical code such as a QR code (registered trademark).

The store main body 2A has a functional configuration similar to that of the store main body 2 in the first embodiment, and further includes the maintenance devices 211 to 213 described above and a sensor device 214 that detects the presence or absence of a moving body in the store main body 2A as a detecting unit.

The devices 211 to 214 are so-called Internet of Things (IoT) devices, and are connected to the Internet 6. The devices 211 to 214 are formed such that the devices 211 to 214 can transmit various information with external devices including the unmanned-mobile store management system 1 via the Internet 6, can appropriately control the operation of the devices 211 to 214 by the management server 3A and the security system 7, and can transmit appropriate information from the devices 211 to 214 to the management server 3A and the security system 7.

Specifically, the maintenance device 211 is a robot cleaner that cleans the floor of the housing unit 21A. The maintenance device 212 is an air conditioning device that performs the ventilation and air conditioning of the housing unit 21A.

The maintenance device 213 is a deodorizing device that deodorizes the housing unit 21A. The sensor device 214 is an infrared sensor that detects the presence or absence of a moving body inside the housing unit 21A.

Note that the maintenance device may be any device as long as the device is a device that executes the maintenance of the store main body 2A, and may be a device different from the devices described above, for example, a device that performs sterilization, antibacterial, sterilization, sterilization, disinfection, and the like of viruses and the like.

Figure 12:
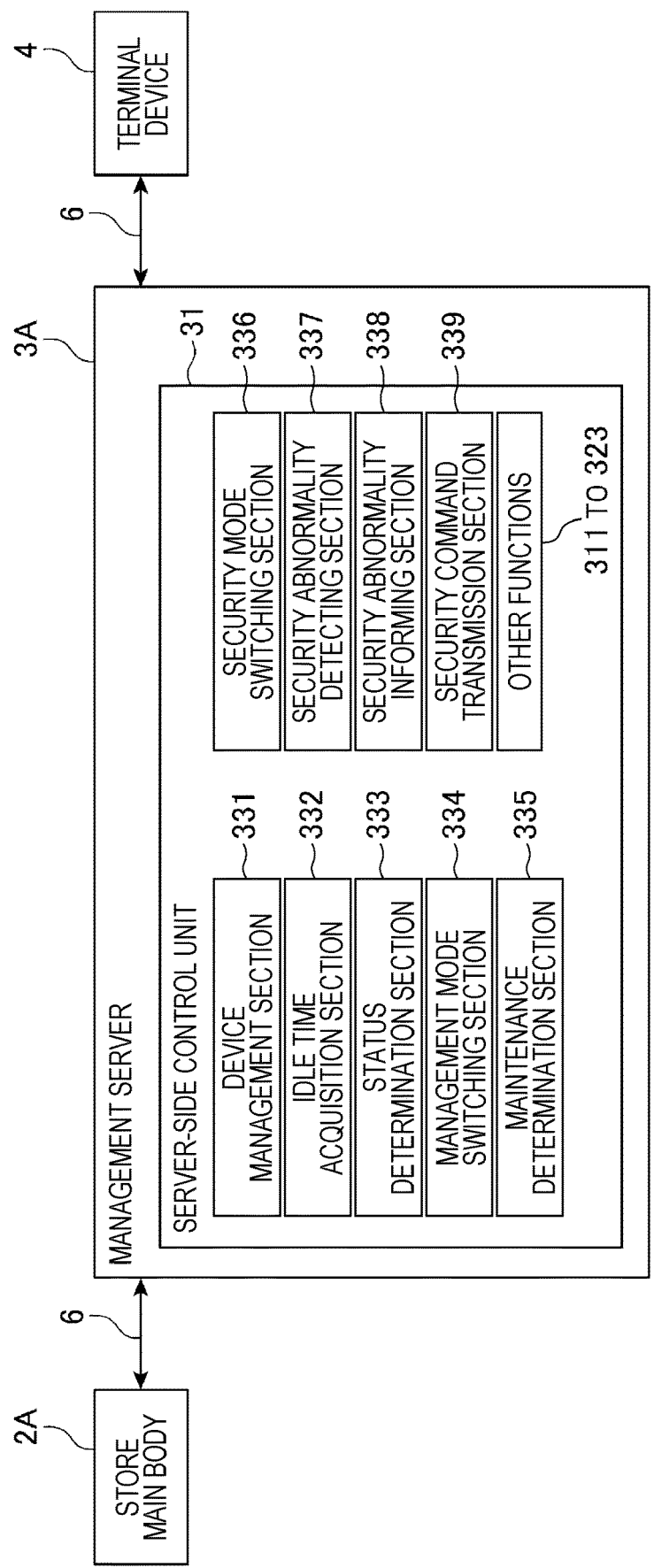
FIG. 12 is a schematic diagram showing functions of a management server.

FIG. 12 is a schematic diagram showing functions of the management server. As shown in FIG. 12, the server-side control unit 31 of the management server 3A has a functional configuration (the sections 311 to 323) similar to that of the management server 3 in the first embodiment, and further includes a device management section 331, an idle time acquisition section 332, a status determination section 333, a management mode switching section 334, a maintenance determination section 335, a security mode switching section 336, a security abnormality detecting section 337, a security abnormality informing section 338, and a security command transmission section 339.

The device management section 331 manages the devices 211 to 214 and sets a command to the devices 211 to 214. In addition, the device management section 331 manages the time necessary for the maintenance devices 211 to 213 to perform maintenance. Here, the necessary time may be calculated based on information such as the size of the housing unit 21A, or information such as the performance of the maintenance devices 211 to 213, or may be a predetermined necessary time.

The idle time acquisition section 332 acquires the idle time of the store main body 2A based on the reservation information. Specifically, after setting the completion of business of the store main body 2A, the idle time acquisition section 332 acquires, as the idle time of the store main body 2A, the time until the time at which a movement command has to be transmitted to the store main body 2A in order to cause a moving unit 23 to move the store main body 2A to the reservation location on the reservation date and time.

The status determination section 333 determines whether it is the idle time of the store main body 2A and the store main body 2A is in an unused status in which there is no moving body in the store main body 2A based on the detection result of the sensor device 214 and the acquisition result of the idle time acquisition section 332.

When the status determination section 333 determines that the store main body 2A is in the unused status, the management mode switching section 334 switches the management mode of the store main body 2A from the normal mode to the maintenance mode. This maintenance mode is a mode in which the maintenance devices 211 to 213 execute the maintenance of the store main body 2A.

Note that in the present embodiment, the status determination section 333 determines whether the store main body 2A is in unused status in which there is no moving body in the store main body 2A based on the detection result of the sensor device 214, and the management mode switching section 334 switches the management mode of the store main body 2A from the normal mode to the maintenance mode when the status determination section 333 determines that the store main body 2A is in the unused status.

On the other hand, for example, the status determination section may determine whether it is idle time of the store main body based only on the acquisition result of the idle time acquisition section, and the management mode switching section may switch the management mode of the store main body from the normal mode to the maintenance mode when the status determination section determines that it is idle time of the store main body. In such a configuration, the unmanned-mobile store management system does not necessarily include the detecting unit.

When the management mode switching section 334 switches the mode to the maintenance mode, the maintenance determination section 335 determines whether the maintenance of the store main body 2A is executable based on the idle time acquired by the idle time acquisition section 332 and the necessary time of the maintenance devices 211 to 213.

Then, when the maintenance determination section 335 determines that maintenance is executable, the device management section 331 sets a maintenance command that executes the maintenance of the store main body 2A and transmits the maintenance command to the maintenance devices 211 to 213 to cause the maintenance devices 211 to 213 to execute maintenance.

When receiving the maintenance command, the maintenance devices 211 to 213 execute a predetermined operation based on the maintenance command and transmit their operation status to the management server 3A. Specifically, when receiving the maintenance command, the maintenance device 211, which is a robot cleaner, cleans the floor surface of the housing unit 21A based on a preset operation procedure, and transmits a completion notification to the management server 3A when the cleaning is completed. In addition, when receiving the maintenance command, the maintenance device 212 that is an air conditioning device and the maintenance device 213 that is a deodorizing device execute ventilation, air conditioning, and deodorization of the housing unit 21A based on a preset operation procedure.

The security mode switching section 336 switches the security mode of the store main body 2A from the normal mode to the security mode when the status determination section 333 determines that the store main body 2A is in the unused status. This security mode is a mode in which the management server 3A and the security system 7 execute the security of the store main body 2A.

The security abnormality detecting section 337 sets an abnormality detection command that detects an abnormality of the store main body 2A when the security mode switching section 336 switches the mode to the security mode, and transmits the abnormality detection command to the sensor device 214 to cause the sensor device 214 to detect an abnormality of the store main body 2A. Then, the security abnormality detecting section 337 detects the abnormality of the store main body 2A based on the detection result of the sensor device 214. Here, the security abnormality detecting section 337 does not detect the operation of the maintenance devices 211 to 213 as an abnormality of the store main body 2A.

Specifically, when receiving the abnormality detection command, the sensor device 214, which is an infrared sensor, detects the presence or absence of a moving body in the housing unit 21A. When detecting a moving object, the sensor device 214 transmits the detection result to the management server 3A. Here, the moving body is a subscriber who moves in the housing unit 21, a moving body, a movable object which partially moves, or the like, and the sensor device 214 detects the movement of such a moving body. Then, the security abnormality detecting section 337 detects the abnormality of the store main body 2A based on the detection result of the sensor device 214.

Note that although the security abnormality detecting section 337 has a non-detection function of not detecting the operation of the maintenance devices 211 to 213 as an abnormality of the store main body 2A, this non-detection function may be omitted when a moving body is not provided as the maintenance device.

When the security abnormality detecting section 337 detects the abnormality of the store main body 2A, the security abnormality informing section 338 informs the administrator of the abnormality of the store main body 2A.

Note that in the present embodiment, although the security abnormality informing section 338 informs the administrator of the abnormality of the store main body 2A, the security abnormality informing section 338 may inform the external security system 7 of the abnormality of the store main body 2A.

When the security mode switching section 336 switches the mode to the security mode, the security command transmission section 339 transmits a command that executes the security of the store main body 2A to the external security system 7 via the Internet 6. The security system 7 starts security of the store main body 2A by receiving this command.

Note that in the present embodiment, the management server 3A includes both the security abnormality detecting section 337, the security abnormality informing section 338, and the security command transmission section 339, and performs the security of the store main body 2A by both the sensor device and the security system 7. However, the management server 3A may include only one of the sensor device 214 and the security system 7, and may perform the security of the store main body 2 by either one of the sensor device and the security system 7.

Management Mode Switching Process

Figure 13:
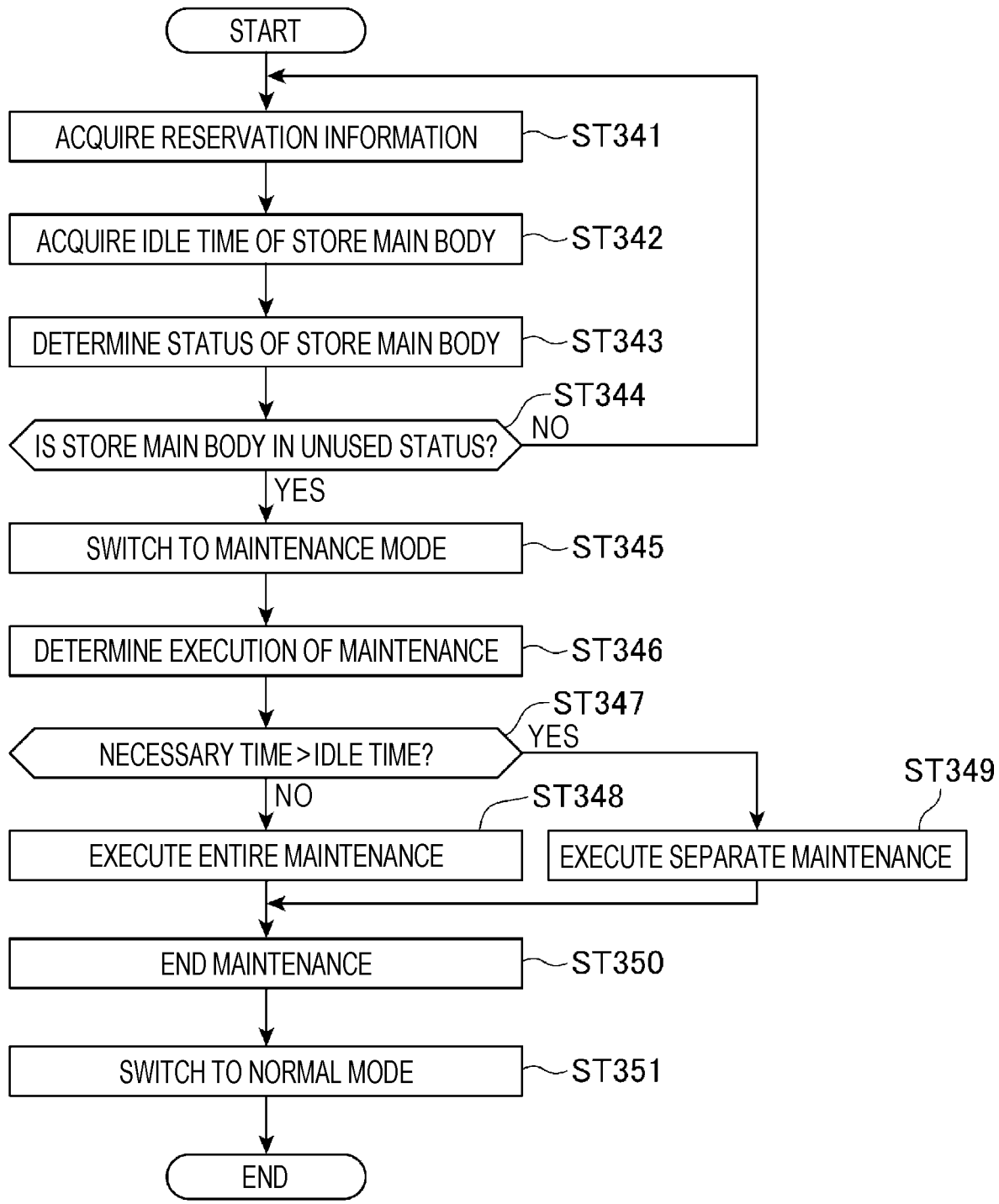
FIG. 13 is a flowchart showing a management mode switching process of a store main body.

FIG. 13 is a flowchart showing a management mode switching process of the store main body. As shown in FIG. 13, the server-side control unit 31 of the management server 3A executes the management mode switching process in Steps ST341 to 351 according to a predetermined program stored in the memory.

In the management mode switching process, the reservation information setting section 311 acquires the reservation information stored in the storage section 323 (Step ST341). Then, the idle time acquisition section 332 acquires the idle time of the store main body 2A based on the reservation information acquired in Step ST341 (Step ST342).

After acquiring the idle time of the store main body 2A in Step ST342, the status determination section 333 determines whether it is the idle time of the store main body 2A and the store main body 2A is in the unused status in which there is no moving body in the store main body 2A based on the detection result of the sensor device 214 and the acquisition result of the idle time acquisition section 332 (Step ST343).

Then, the server-side control unit 31 executes the process in Step ST345 and the subsequent steps when determining that the store main body 2A is in the unused status, and repeatedly executes the process in Step ST341 and the subsequent steps when determining that the store main body 2A is not in the unused status (Step ST344).

In Step ST345, the management mode switching section 334 switches the management mode of the store main body 2A from the normal mode to the maintenance mode when the status determination section 333 determines that the store main body 2A is in the unused status.

After switching the management mode of the store main body 2A from the normal mode to the maintenance mode in Step ST345, the maintenance determination section 335 determines whether the maintenance of the store main body 2A is executable based on the idle time acquired by the idle time acquisition section 332 and the necessary time of the maintenance devices 211 to 213 (Step ST346).

Specifically, the maintenance determination section 335 compares the idle time acquired by the idle time acquisition section 332 with the time necessary to execute maintenance by the maintenance devices 211 to 213 managed by the device management section 331 (Step ST347).

Then, when the necessary time is shorter than the idle time, the device management section 331 sets a maintenance command that executes the maintenance of the store main body 2A and transmits the maintenance command to the maintenance devices 211 to 213 to cause the maintenance devices 211 to 213 to execute the entire maintenance process (Step ST348).

Here, the entire maintenance process is a predetermined maintenance operation set for each of the maintenance devices 211 to 213, and is, for example, maintenance that causes the maintenance device 213, which is a robot cleaner, to perform cleaning of the entire range of the housing unit 21A.

On the other hand, when the necessary time is longer than the idle time, the device management section 331 does not execute the maintenance of the store main body 2A, or sets a maintenance command that executes the maintenance of the store main body 2A, and transmits the maintenance command to the maintenance devices 211 to 213 to cause the maintenance devices 211 to 213 to execute the separate maintenance process (Step ST349).

Here, the separate maintenance process is a maintenance operation that is executable within an idle time, and is, for example, a maintenance that causes the maintenance device 213, which is a robot cleaner, to execute cleaning in a half range of the housing unit 21A, or to execute the cleaning of a portion with high priority. Such a maintenance operation that is executable within the idle time is appropriately set to the maintenance devices 211 to 213.

After executing the entire maintenance process in Step ST348 or the separate maintenance process in Step ST349, the device management section 331 ends the maintenance of the store main body 2A (Step ST350). After completion of the maintenance of the store main body 2A in Step ST350, the management mode switching section 334 switches the management mode of the store main body 2A from the maintenance mode to the normal mode (Step ST351). After that, the server-side control unit 31 ends the management mode switching process.

Security Mode Switching Process

Figure 14:
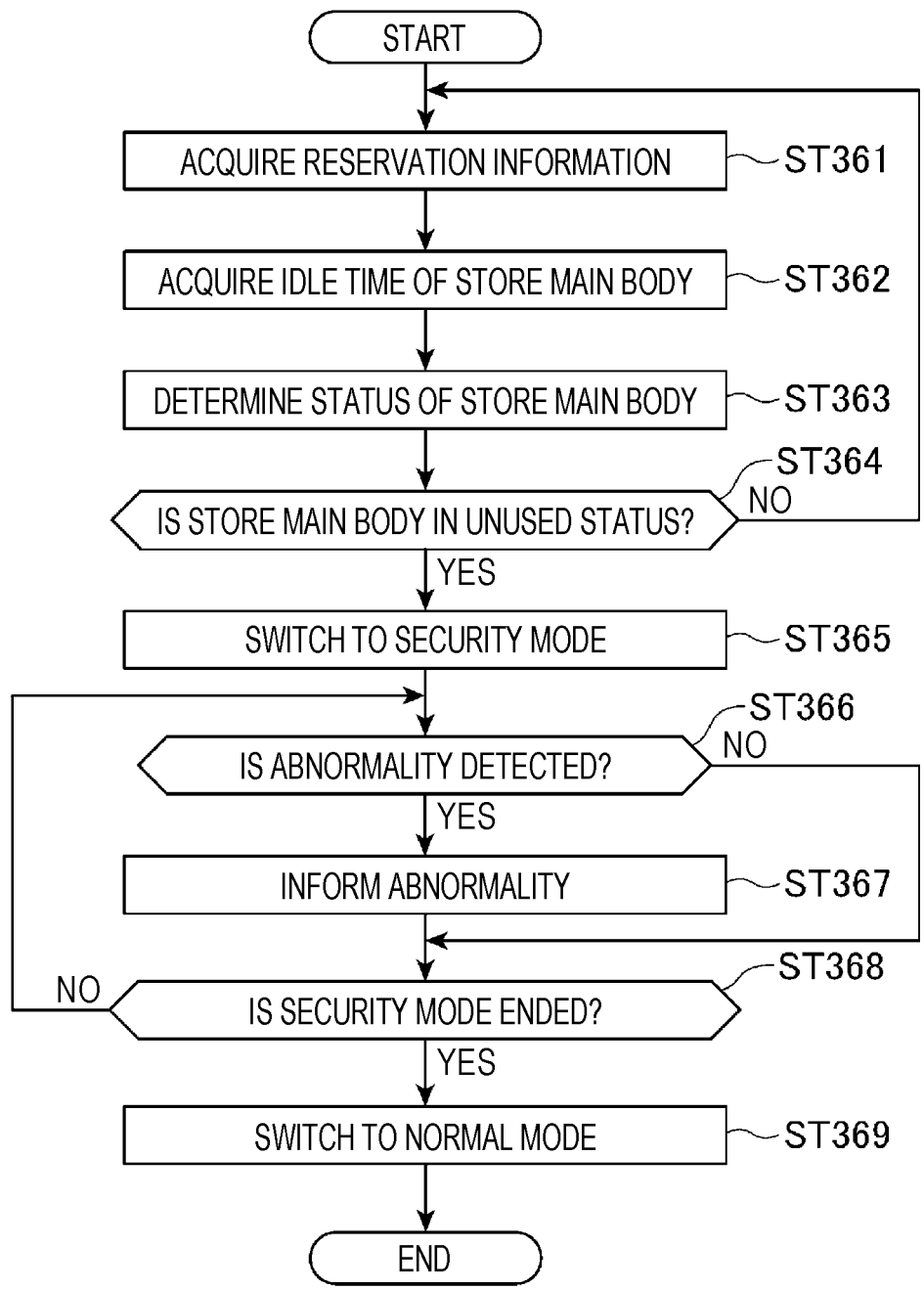
FIG. 14 is a flowchart showing a security mode switching process of the store main body.

FIG. 14 is a flowchart showing a security mode switching process of the store main body. As shown in FIG. 14, the server-side control unit 31 of the management server 3A executes the security mode switching process in Steps ST361 to 369 according to a predetermined program stored in the memory.

In the security mode switching process, the reservation information setting section 311 acquires the reservation information stored in the storage section 323 (Step ST361). Then, the idle time acquisition section 332 acquires the idle time of the store main body 2A based on the reservation information acquired in Step ST361 (Step ST362).

After acquiring the idle time of the store main body 2A in Step ST362, the status determination section 333 determines whether it is the idle time of the store main body 2A and the store main body 2A is in the unused status in which there is no moving body in the store main body 2A based on the detection result of the sensor device 214 and the acquisition result of the idle time acquisition section 332 (Step ST363).

Then, the server-side control unit 31 executes the process in Step ST365 and the subsequent steps when determining that the store main body 2A is in the unused status, and repeatedly executes the processes in Step ST361 and the subsequent steps when determining that the store main body 2A is not in the unused status (Step ST364).

In Step ST365, the security mode switching section 336 switches the security mode of the store main body 2A from the normal mode to the security mode when the status determination section 333 determines that the store main body 2A is in the unused status.

After switching the security mode of the store main body 2A from the normal mode to the security mode in Step ST365, the security abnormality detecting section 337 sets an abnormality detection command that detects an abnormality of the store main body 2A and transmits the abnormality detection command to the sensor device 214 to cause the sensor device 214 to detect an abnormality of the store main body 2A (Step ST366). Then, when it is determined in Step ST366 that an abnormality of the store main body 2A is detected, the security abnormality informing section 338 informs the administrator of the abnormality of the store main body 2A (Step ST367).

After executing the process in Step ST367 or when a determination is made that no abnormality of the store main body 2A is detected in Step ST366, the server-side control unit 31 determines whether to end the security mode (Step ST368). Here, when the time comes at which the moving unit 23 has to transmit a movement command to the store main body 2A in order to move the store main body 2A to the reservation location on the reservation date and time, the server-side control unit 31 determines that the security mode is ended and determines that the security mode is not ended when it is not this time.

When it is determined in Step ST368 that the security mode is not to be ended, the server-side control unit 31 executes the process in Step ST366 again. On the other hand, when it is determined in Step ST368 that the security mode is to be ended, the security mode switching section 336 switches the security mode of the store main body 2A from the security mode to the normal mode (Step ST369).

After that, the server-side control unit 31 ends the security mode switching process. According to the present embodiment as described above, in addition to the same operations and effects as those of the first embodiment, the following operations and effects can be achieved.

(21) The server-side control unit 31 includes the idle time acquisition section 332 that acquires the idle time of the store main body 2A based on the reservation information, the status determination section 333 that determines whether it is the idle time of the store main body 2A based on the acquisition result of the idle time acquisition section 332, and the management mode switching section 334 that switches the management mode of the store main body 2A from the normal mode to the maintenance mode in which the maintenance of the store main body 2A is executed by the maintenance devices 211 to 213 when the status determination section 333 determines that it is the idle time of the store main body 2A. Accordingly, the maintenance of the store main body 2A is executable before the reservation start time of the next subscriber. Accordingly, it is possible to cause the maintenance devices 211 to 213 to execute maintenance by efficiently using the idle time of the store main body 2A, it is possible to reduce the manual maintenance work, and it is possible to suppress the operation cost of the unmanned-mobile store management system 1.

(22) The server-side control unit 31 includes the maintenance determination section 335 that determines whether the maintenance is executable based on the idle time acquired by the idle time acquisition section 332 and the necessary time of the maintenance devices 211 to 213 when the management mode switching section 334 switches the mode to the maintenance mode, and the device management section 331 causes the maintenance devices 211 to 213 to execute the maintenance when the maintenance determination section 335 determines that the maintenance is executable. Accordingly, this enables the unmanned-mobile store management system 1 to reliably end the maintenance before the reservation start time of the next subscriber.

(23) The status determination section 333 determines, based on the detection result of the sensor device 214 and the acquisition result of the idle time acquisition section 332, whether the store main body 2A is in the idle time and is in the unused status in which there is no moving body in the store main body 2A, and the management mode switching section 334 switches the management mode of the store main body 2A from the normal mode to the maintenance mode when the status determination section 333 determines that the store main body 2A is in the unused status. Accordingly, it is possible to confirm that the store main body 2A is in the unused status in which there is no moving body in the store main body 2A and it is possible to execute the maintenance of the store main body 2A before the reservation start time of the next subscriber. Accordingly, it is possible to cause the maintenance devices 211 to 213 to execute maintenance by efficiently using the idle time of the store main body 2A, it is possible to reduce the manual maintenance work, and it is possible to suppress the operation cost of the unmanned-mobile store management system 1.

(24) Since the server-side control unit 31 includes the security mode switching section 336 that switches the security mode from the normal mode to the security mode that executes the security of the store main body 2A when the status determination section 333 determines that the store main body 2A is in the unused status, it is possible to execute the security of the store main body 2A before the reservation start time of the next subscriber.

(25) The server-side control unit 31 includes the security abnormality detecting section 337 that detects the abnormality of the store main body 2A based on the detection result of the sensor device 214 when the security mode switching section 336 switches the mode to the security mode, and the security abnormality informing section 338 that informs the administrator of the abnormality of the store main body 2A when the security abnormality detecting section 337 detects the abnormality of the store main body 2A. Accordingly, this enables the administrator to easily grasp the abnormality of the store main body 2A.

(26) Since the security abnormality detecting section 337 does not detect the operation of the maintenance devices 211 to 213 as an abnormality of the store main body 2A, this enables the server-side control unit 31 to cause the maintenance devices 211 to 213 to execute maintenance even when the security mode switching section 336 switches the mode to the security mode.

(27) Since the server-side control unit 31 includes the security command transmission section 339 that transmits a command that executes the security of the store main body 2A to the external security system 7 via the Internet 6 when the security mode switching section 336 switches the mode to the security mode, a device that executes the security of the store main body 2A is not necessarily included, it is possible to simplify the configuration of the store main body 2A, and it is possible to further suppress the operation cost of the unmanned-mobile store management system 1.

Third Embodiment

In the following, a third embodiment of the present disclosure will be described with reference to the drawings.

Figure 15:
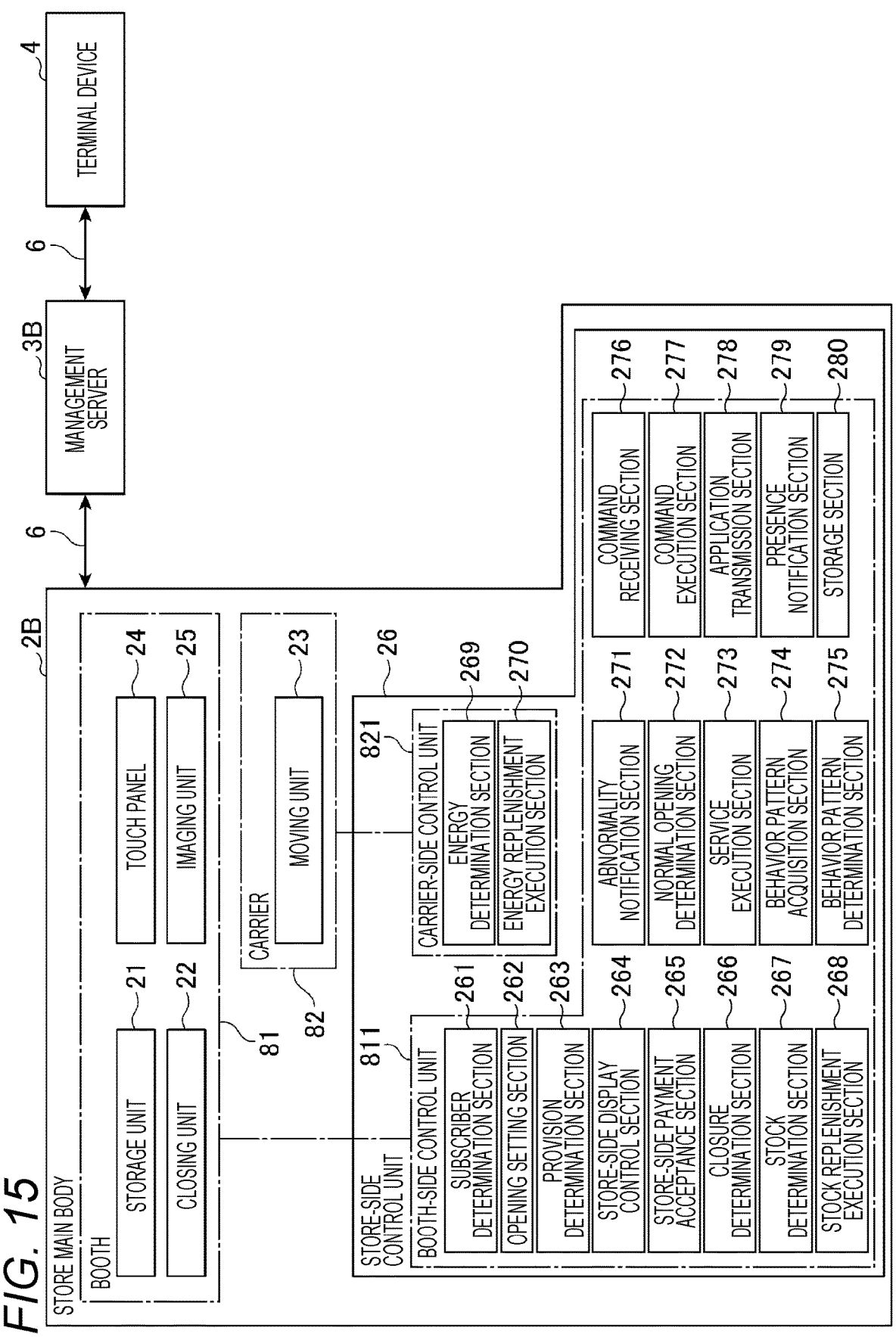
FIG. 15 is a schematic diagram showing functions of a store main body according to a third embodiment of the present disclosure.

FIG. 15 is a schematic diagram showing functions of a store main body according to the third embodiment of the present disclosure. In the first embodiment, the unmanned-mobile store management system 1 includes the store main body 2 and the management server 3, and the store main body 2 includes the housing unit 21, the closing unit 22, the moving unit 23, and the store-side control unit 26.

On the other hand, in the present embodiment, as shown in FIG. 15, an unmanned-mobile store management system 1 includes a store main body 2B and a management server 3B, and the store main body 2B includes a booth 81 including a housing unit 21, a closing unit 22, a touch panel 24, and an imaging unit 25, and a carrier 82 including a moving unit 23 that moves the booth 81. Note that in the following description, the components already described are denoted by the same reference numerals, and the description is omitted.

The store-side control unit 26 includes a booth-side control unit 811 that is provided in the booth 81 and controls the booth 81, and a carrier-side control unit 821 that is provided in the carrier 82 and controls the carrier 82. The booth-side control unit 811 has other functions (a subscriber determination section 261 to a stock replenishment execution section 268, and an abnormality notification section 271 to a storage section 280) except an energy determination section 269 and an energy replenishment execution section 270. The carrier-side control unit 821 has functions of the energy determination section 269 and the energy replenishment execution section 270.

Note that in the present embodiment, the carrier-side control unit 821 has the functions of the energy determination section 269 and the energy replenishment execution section 270, and the booth-side control unit 811 does not have the functions of the energy determination section and the energy replenishment execution section. However, when it is necessary to supply energy to the booth, the booth-side control unit and the carrier-side control unit may have the functions of both the energy determination section and the energy replenishment execution section.

Here, in the present embodiment, the unmanned-mobile store management system 1 includes a plurality of store main bodies 2B. The booth 81 and the carrier 82 in each store main body 2B are detachably formed. Note that in the present disclosure, the booth and the carrier may be one set or a plurality of sets. In addition, in the present disclosure, the number of booths and the number of carriers are not necessarily the same, and the store main body only has to include at least one booth and a plurality of carriers.

Figure 16:
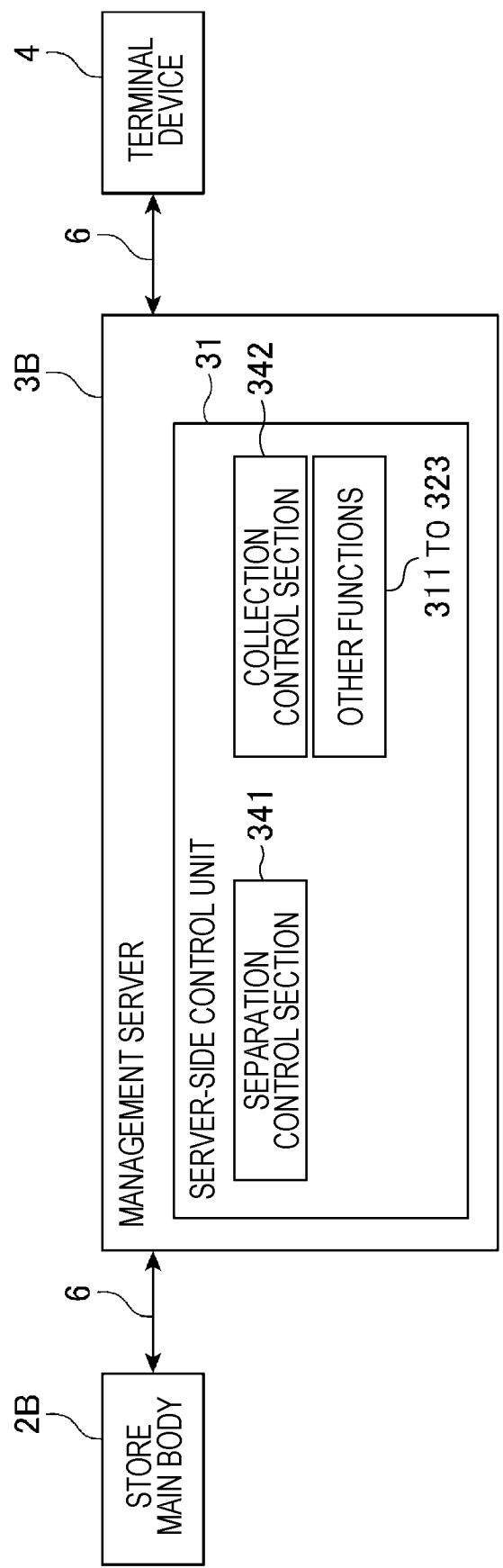
FIG. 16 is a schematic diagram showing functions of a management server.

FIG. 16 is a schematic diagram showing functions of the management server. As shown in FIG. 16, the server-side control unit 31 of the management server 3B has a functional configuration (the sections 311 to 323) similar to that of the management server 3 in the first embodiment, and further includes a separation control section 341 and a collection control section 342.

After the movement control section 312 causes the moving unit 23 to move the store main body 2B to the reservation location based on the reservation information, the separation control section 341 separates the booth 81 and the carrier 82 to make the carrier 82 independently movable.

The collection control section 342 moves the carrier 82 to a location where the booth 81 is present based on the establishment of a predetermined condition, and then collects the booth 81 by coupling the booth 81 to the carrier 82. Note that in the present embodiment, although conditions that a payment is accepted or that the reservation end time has come are set as the predetermined condition, other conditions may be set as the predetermined condition.

Note that in the present embodiment, the collection control section 342 collects the booth 81 by moving the carrier 82 to a location where the booth 81 is present based on the establishment of a predetermined condition and then coupling the booth 81 to the carrier 82. On the other hand, the booth is not necessarily collected by the carrier, and may be collected by a business person or the like, for example. In short, in the present disclosure, the booth and the carrier only has to be detachably formed.

According to the present embodiment as described above, in addition to the same operations and effects as those of the first embodiment, the following operations and effects can be achieved.

(28) The store main body 2B includes the booth 81 provided with the housing unit 21 and the closing unit 22, and the carrier 82 provided with the moving unit 23 that moves the booth 81, and the booth 81 and the carrier 82 are detachably formed. Therefore, after the movement control section 312 moves the store main body 2B to the reservation location by the moving unit 23 based on the reservation information, the booth 81 and the carrier 82 are separated. Accordingly, it is possible to independently move the carrier 82. Therefore, the unmanned-mobile store management system 1 enables individual control and efficient operation of the booth 81 and the carrier 82.

(29) The store main body 2B includes at least one booth 81 and a plurality of carriers 82, and each of the booth 81 and the carrier 82 is detachably formed. Therefore, for example, after the booth 81 is moved to a reservation location on a certain carrier 82, it is possible to collect the booth 81 by another carrier 82. Therefore, the unmanned-mobile store management system 1 enables individual control and efficient operation of the booth 81 and the carrier 82.

(30) The server-side control unit 31 includes the collection control section 342 that moves the carrier 82 to the location where the booth 81 is present based on the establishment of a predetermined condition and then couples the booth 81 to the carrier 82 to collect the booth 81. Therefore, for example, it is possible to collect the booth 81 by the carrier 82 under a predetermined condition that the confirmation of the commodity by the subscriber is completed. Therefore, the unmanned-mobile store management system 1 enables individual control and efficient operation of the booth 81 and the carrier 82.

MODIFICATIONS OF EMBODIMENTS

Note that the present disclosure is not limited to the foregoing embodiments, and modifications, improvements, and the like within a range in which the object of the present disclosure can be achieved are included in the present disclosure.

For example, in the foregoing embodiments, the various functions of the unmanned-mobile store management system 1 are distributed and mounted to the store main bodies 2, 2A, and 2B and the management servers 3, 3A, and 3B. However, any function may be distributed and mounted to either the store main bodies 2, 2A, and 2B or the management servers 3, 3A, and 3B, may be integrally mounted without distribution, and may be appropriately designed as long as the various functions of the unmanned-mobile store management system 1 can be achieved. For example, in the foregoing embodiments, although the closing unit 22 is mounted on the store main bodies 2, 2A, and 2B, the closing unit 22 may be connected to the management servers 3, 3A, and 3B via the Internet 6.

In the foregoing embodiments, the store main bodies 2, 2A, and 2B and the management servers 3, 3A, and 3B may be formed of a centralized server device, or may be of a distributed management type. For example, a device using a distributed transaction ledger represented by a blockchain may be used, and any device may be used as long as the device can manage reservation information and can transmit and receive various types of information for process.

In addition, in the foregoing embodiments, the management servers 3, 3A, and 3B and the reservation site 5 are separately provided and connected to each other via the Internet 6. However, the present disclosure is not limited to this. In addition, the management servers 3, 3A, and 3B and the reservation site 5 may be provided at a single site, or the functions of the management servers 3, 3A, and 3B and the reservation site 5 may be formed of a plurality of devices distributed on the Internet 6.

In the foregoing embodiments, the reservation information setting section 311 receives the reservation of the store main body 2 through the terminal device 4 to store and set the reservation information regarding the subscriber, the reservation location, and the reservation date and time (reservation start time and reservation end time) in the storage section 323.

On the other hand, the reservation information setting section may receive the reservation of the store main body through the subscriber input unit to store and set the reservation information regarding only the reservation location in the storage section.

In the foregoing embodiments, the storage section 280 stores in advance a plurality of samples of normal behavior patterns of the subscriber, and the behavior pattern determination section 275 compares the plurality of samples of behavior patterns stored in the storage section 280 with the behavior pattern acquired by the behavior pattern acquisition section 274 to determine whether there is a difference, and detects the abnormality occurring in the store main body 2 when a determination is made that there is a difference.

On the other hand, the behavior pattern storage section may store a sample of an abnormal behavior pattern of the subscriber, and the behavior pattern determination section may compare the sample of the behavior pattern stored in the behavior pattern storage section with the behavior pattern acquired by the behavior pattern acquisition section to determine whether the samples match, and detect the abnormality generated in the store main body when a determination is made that the samples match.

According to such a configuration, the store-side control unit includes the behavior pattern determination section that compares a sample of the abnormal behavior pattern of the subscriber of the store main body with the behavior pattern acquired by the behavior pattern acquisition section to determine whether the sample of the abnormal behavior pattern matches the behavior pattern acquired by the behavior pattern acquisition section and that detects the abnormality occurring in the store main body when the sample of the abnormal behavior pattern matches the behavior pattern acquired by the behavior pattern acquisition section. Accordingly, for example, by storing a suspicious behavior pattern such as looking for a commodity in the behavior pattern storage section as an abnormal behavior pattern, this enables the behavior pattern determination section to detect an intruder with a suspicious behavior pattern as an abnormality, and it is possible to improve the safety of the store main body.

In the foregoing embodiments, the command creation section 319 creates the extension command that informs whether the reservation time according to the reservation status of the store main bodies 2, 2A, and 2B can be extended, and the command execution section 277 of the store main bodies 2, 2A, and 2B informs the subscriber whether the extension is possible. However, the function of informing whether the extension is possible can be omitted. In the foregoing embodiments, the store main body 2, 2A, or 2B includes the touch panel 24 that receives the extension application input from the subscriber and the application transmission section 278 that transmits the extension application to the management server 3, 3A, or 3B, and the management server 3, 3A, or 3B includes the application receiving section 321 that receives the extension application. However, the function of inputting and transmitting the extension application can be omitted. Further, the functions regarding the notification and application of the extension may be executed using the terminal device 4 of the subscriber through the reservation site 5.

In the foregoing embodiments, the command creation section 319 creates the warning command that informs the subscriber of the warning when the subscriber is present even at reservation end time or later, and the command execution section 277 of each of the store main bodies 2, 2A, and 2B informs the subscriber that the reservation end time has elapsed. However, the function of informing excess time can be omitted. In addition, the function of informing excess time may be executed using the terminal device 4 of the subscriber through the reservation site 5.

In addition, in the unmanned-mobile store management system 1 according to the foregoing embodiments, the management system 1 may include a first store main body and a second store main body different from the first store main body, the reservation information setting section may store reservation information regarding the commodity desired by the subscriber in the storage section, the server-side control unit may include a store main body selecting section that selects at least one of the first store main body and the second store main body as the store main body including the commodity desired by the subscriber based on the reservation information, and the movement control section may move the store main body selected by the store main body selecting section to the reservation location by the moving unit based on the reservation information.

According to such a configuration, the server-side control unit includes the store main body selecting section that selects at least one of the first store main body and the second store main body as the store main body including the commodity desired by the subscriber based on the reservation information, and the movement control section causes the moving unit to move the store main body selected by the store main body selecting section to the reservation location based on the reservation information. Accordingly, this enables the subscriber to reliably confirm the commodity stored in the store main body by going to the reservation location or waiting at the reservation location.

Further, in the unmanned-mobile store management system 1 according to the foregoing embodiments, the reservation information setting section may store the reservation information on the subscriber and the commodity desired by the subscriber in the storage section, the store-side control unit may include the subscriber determination section that determines whether a visitor is the subscriber based on the reservation information, and the commodity determination section that determines whether the commodity is the commodity desired by the subscriber based on the reservation information, and may include a desired commodity opening setting section that opens the closing unit to provide the commodity housed in the housing unit when the subscriber determination section determines that the commodity is the subscriber and the commodity determination section determines that the commodity is the commodity is the commodity desired by the subscriber.

According to such a configuration, the store-side control unit includes the desired commodity opening setting section that opens the closing unit to provide the commodity housed in the housing unit when the subscriber determination section determines that the visitor is the subscriber and the commodity determination section determines that the commodity is the commodity desired by the subscriber. Accordingly, this enables the subscriber to reliably receive the provision of the desired commodity without providing the desired commodity to other subscribers.

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

What is claimed is:

1. An unmanned-mobile store management system comprising:
    a store main body that stores a commodity including an article and a device performing services;
    a management server that is connected to the store main body through a communication line and that manages the store main body; and
    a subscriber input unit that is connected to the management server through a communication line and that accepts an operation input of a subscriber;
    wherein the store main body includes:
        a housing unit that houses a commodity,
        a closing unit that closes the commodity housed in the housing unit such that the commodity is not allowed to be provided,
        a moving unit that moves the store main body, and
        a store-side control unit that controls the store main body;
    the management server includes a server-side control unit that controls the management server; and
    the server-side control unit includes:
        a reservation information setting section that stores reservation information on including a reservation location in a storage section and that sets the reservation information by accepting a reservation of the store main body through the subscriber input unit, and
        a movement control section that causes the moving unit to move the store main body to the reservation location based on the reservation information.

2. The unmanned-mobile store management system according to claim 1, wherein:
    the reservation information setting section stores reservation information regarding a reservation date and time in the storage section; and
    the movement control section causes the moving unit to move the store main body to the reservation location on the reservation date and time based on the reservation information.

3. The unmanned-mobile store management system according to claim 2, wherein the server-side control unit includes a movement status informing section that informs the subscriber of movement status of the store main body.

4. The unmanned-mobile store management system according to claim 1, wherein:
    the reservation information setting section stores reservation information regarding the subscriber in the storage section; and
    the store-side control unit includes:
        a subscriber determination section that determines whether a visitor is a subscriber based on the reservation information, and
        an opening setting section that opens the closing unit and provides the commodity housed in the housing unit when the subscriber determining section determines that the visitor is the subscriber.

5. The unmanned-mobile store management system according to claim 4, wherein the store-side control unit includes a provision determination section that determines whether the commodity housed in the housing unit is provided.

6. The unmanned-mobile store management system according to claim 5, wherein:
    the store main body includes:
        a store-side display unit that displays information, and
        a store-side input unit that receives an operation input; and
    the store-side control unit includes:

a store-side display control section that causes the store-side display unit to display a provision amount of a commodity provided to the subscriber based on presence or absence of provision of a commodity determined by the provision determination section, and a store-side payment acceptance section that accepts a payment according to a provision amount of a commodity provided to the subscriber through the store-side input unit.

7. The unmanned-mobile store management system according to claim 5, wherein:

the subscriber input unit includes:
a reservation-side display unit that displays information, and
a reservation-side input unit that receives an operation input; and the server-side control unit includes:
a server-side display control section that causes the reservation-side display unit to display a provision amount of a commodity provided to the subscriber based on presence or absence of provision of a commodity determined by the provision determination section, and
a server-side payment acceptance section that accepts a payment according to a provision amount of a commodity provided to a subscriber through the reservation side input unit.

8. The unmanned-mobile store management system according to claim 1, wherein the store-side control unit includes a closure determination section that determines whether the housing unit is closed by the closing unit.

9. The unmanned-mobile store management system according to claim 1, wherein the server-side control unit includes a location securing execution section that executes the securing of a reservation location based on the reservation information.

10. The unmanned-mobile store management system according to claim 1, wherein the store-side control unit includes:

a stock determination section that determines whether a stock of the commodity housed in the housing unit is insufficient; and
a stock replenishment execution section that replenishes the stock of the commodity housed in the housing unit when the stock determination section determines that the stock of the commodity is insufficient.

11. The unmanned-mobile store management system according to claim 1, wherein the store-side control unit includes:

an energy determination section that determines whether energy of the store main body is insufficient; and
an energy replenishment execution section that replenishes energy of the store main body when the energy determination section determines that energy is insufficient.

12. The unmanned-mobile store management system according to claim 11, wherein the energy replenishment execution section receives an energy supply from another store main body and replenishes energy of the store main body.

13. The unmanned-mobile store management system according to claim 1, wherein:

the subscriber input unit includes a reservation-side display unit that displays information; and the server-side control unit includes a server-side display control section that causes the reservation-side display unit to display the commodity housed in the housing unit.

14. The unmanned-mobile store management system according to claim 13, further comprising:

a first store main body; and
a second store main body different from the first store main body;
wherein the reservation information setting section causes the storage section to store reservation information on a commodity desired by the subscriber;
wherein the server-side control unit includes a store main body selecting section that selects at least one of the first store main body and the second store main body as the store main body including a commodity desired by the subscriber based on the reservation information; and
wherein the movement control section causes the moving unit to move the store main body selected by the store main body selecting section to the reservation location based on the reservation information.

15. The unmanned-mobile store management system according to claim 13, wherein:

the reservation information setting section stores reservation information on the subscriber and a commodity desired by the subscriber in the storage section;
the store-side control unit includes:
a subscriber determination section that determines whether a visitor is a subscriber based on the reservation information,
a commodity determination section that determines whether the commodity is a commodity desired by the subscriber based on the reservation information, and
a desired commodity opening setting section that opens the closing unit to provide the commodity housed in the housing unit when the subscriber determination section determines that the customer is the subscriber and the commodity determination section determines that the customer is a commodity desired by the subscriber.

16. The unmanned-mobile store management system according to claim 1, wherein:

the store-side control unit includes an abnormality notification section that informs the management server of an abnormality of the store main body through a communication line when an abnormality having occurred in the store main body is detected; and the server-side control unit includes an abnormality informing section that informs an administrator of an abnormality of the store main body when the abnormality notification section informs the abnormality of the store main body.

17. The unmanned-mobile store management system according to claim 16, wherein the store-side control unit includes a normal opening determination section that determines whether the closing unit is normally opened and detects an abnormality occurring in the store main body when a determination is made that the closing unit is not normally opened.

18. The unmanned-mobile store management system according to claim 17, wherein:

the store main body includes a service unit that serves a subscriber; and the store-side control unit includes a service execution section that executes service by the service unit when the normal opening determination section determines that the closing unit is normally opened.

19. The unmanned-mobile store management system according to claim 16, wherein:
the store main body includes an imaging unit that captures an image of the store main body; and
the store-side control unit includes:
a behavior pattern storage section that stores a sample of a normal behavior pattern of a subscriber,
a behavior pattern acquisition section that acquires a behavior pattern of a subscriber based on an image captured by the imaging unit, and
a behavior pattern determination section that compares a sample of a behavior pattern stored in the behavior pattern storage section with a behavior pattern acquired by the behavior pattern acquisition section to determine whether the sample of the behavior pattern is different from the behavior pattern acquired by the behavior pattern acquisition section, and detects an abnormality generated in the store main body when determining that the sample of the behavior pattern is different from the behavior pattern acquired by the behavior pattern acquisition section.

20. The unmanned-mobile store management system according to claim 16, wherein:
the store main body includes an imaging unit that captures an image of the store main body; and
the store-side control unit includes:
a behavior pattern storage section that stores a sample of an abnormal behavior pattern of the subscriber,
a behavior pattern acquisition section that acquires a behavior pattern of the subscriber based on an image captured by the imaging unit, and
a behavior pattern determination section that compares a sample of the behavior pattern stored in the behavior pattern storage section with the behavior pattern acquired by the behavior pattern acquisition section to determine whether the sample of the behavior pattern matches the behavior pattern acquired by the behavior pattern acquisition section, and detects an abnormality occurring in the store main body when the sample of the behavior pattern matches the behavior pattern acquired by the behavior pattern acquisition section.

21. The unmanned-mobile store management system according to claim 1, wherein:
the server-side control unit includes:
a reservation management section that manages the reservation information including a reservation start time and a reservation end time,
a command creation section that generates a command to the store main body, and
a command transmission section that transmits a command to the store main body through a communication line; and
the store-side control unit includes:
a command receiving section that receives a command from the command transmission section, and
a command execution section that executes a predetermined operation based on the command received by the command receiving section.

22. The unmanned-mobile store management system according to claim 21, wherein:
the command creation section creates an informing command that informs a reservation end time based on the reservation information, and
the command execution section informs the subscriber of the reservation end time based on the informing command.

23. The unmanned-mobile store management system according to claim 21, wherein:
the reservation management section manages the reservation information including a reservation status at reservation end time or later;
the command creation section creates an extension command that informs whether to extend the reservation time according to the reservation status based on the reservation information; and
the command execution section informs the subscriber whether the extension is possible based on the extension command.

24. The unmanned-mobile store management system according to claim 23, wherein:
the store main body includes an extension acceptance unit that accepts an input of an extension application by the subscriber;
the store-side control unit includes an application transmission section that transmits the extension application to the management server through a communication line when the extension acceptance unit accepts the input of the extension application;
the server-side control unit includes an application receiving section that receives the extension application transmitted from the application transmission section; and
the reservation management section changes a reservation end time and updates the reservation information based on the extension application received by the application receiving section.

25. The unmanned-mobile store management system according to claim 1, further comprising
a maintenance device that performs maintenance of the store main body;
wherein the server-side control unit includes:
a reservation management section that manages the reservation information including a reservation start time and a reservation end time,
an idle time acquisition section that acquires an idle time of the store main body based on the reservation information,
a status determination section that determines whether the idle time is idle time of the store main body based on an acquisition result of the idle time acquisition section, and
a management mode switching section that switches a management mode of the store main body from a normal mode to a maintenance mode in which maintenance of the store main body is executed by the maintenance device when the status determination section determines that the idle time is idle time of the store main body.

26. The unmanned-mobile store management system according to claim 25, wherein:
the server-side control unit includes:
a device management section that manages a time necessary to execute maintenance by the maintenance device, and
a maintenance determination section that determines whether maintenance is allowed to be executed based on idle time acquired by the idle time acquisition section and a necessary time of the maintenance device when the management mode switching section switches the mode to the maintenance mode; and the device management section causes the maintenance device to execute maintenance when the maintenance determination section determines that the maintenance is executable.

27. The unmanned-mobile store management system according to claim 25, further comprising:
a detecting unit that detects presence or absence of a moving body in the store main body;
wherein the status determination section determines, based on a detection result of the detecting unit and an acquisition result of the idle time acquisition section, whether the store main body is in an idle time and in an unused status in which there is no moving body in the store main body; and
wherein the management mode switching section switches the management mode of the store main body from the normal mode to the maintenance mode when the status determination section determines that the store main body is in the unused status.

28. The unmanned-mobile store management system according to claim 27, wherein the server-side control unit includes a security mode switching section that switches a security mode from a normal mode to a security mode in which security of the store main body is executed when the status determination section determines that the store main body is in the unused status.

29. The unmanned-mobile store management system according to claim 28, wherein the server-side control unit includes:
a security abnormality detecting section that detects an abnormality of the store main body based on a detection result of the detecting unit when the security mode switching section switches the mode to the security mode; and
a security abnormality informing section that informs an administrator of the abnormality of the store main body when the security abnormality detecting section detects the abnormality of the store main body.

30. The unmanned-mobile store management system according to claim 29, wherein the security abnormality detecting section does not detect an operation of the maintenance device as an abnormality of the store main body.

31. The unmanned-mobile store management system according to claim 28, wherein the server-side control unit includes a security command transmission section that transmits a command that executes the security of the store main body to an external security system through a communication line when the security mode switching section switches the mode to the security mode.

32. The unmanned-mobile store management system according to claim 1, wherein:
the store main body includes:
a booth including the housing unit and the closing unit, and
a carrier including the moving unit that moves the booth;
the store-side control unit includes:
a booth-side control unit that controls the booth, and
a carrier-side control unit that controls the carrier; and
the booth and the carrier are detachably formed.

33. The unmanned-mobile store management system according to claim 32, wherein:
the store main body includes:
at least one of the booths, and
a plurality of the carriers; and
each of the booth and the carrier is detachably formed.

34. The unmanned-mobile store management system according to claim 32, wherein the server-side control unit includes:
a separation control section that causes the moving unit to move the store main body to a reservation location by the movement control section based on the reservation information, and then separates the booth from the carrier to make the carrier movable independently; and
a collection control section that collects the booth by coupling the booth to the carrier after moving the carrier to a location where the booth is present based on the establishment of a predetermined condition.

* * * * *